United States Patent [19]
Fujita et al.

[11] Patent Number: 6,157,760
[45] Date of Patent: Dec. 5, 2000

[54] TWO-WAY OPTICAL COMMUNICATION DEVICE AND TWO-WAY OPTICAL COMMUNICATION APPARATUS

[75] Inventors: Hideaki Fujita, Shiki-gun; Yorishige Ishii, Yamatotakada; Toshiyuki Matsushima, Nara; Kuniaki Okada, Tenri, all of Japan

[73] Assignee: Sharp Kabushiki Kaisha, Osaka, Japan

[21] Appl. No.: 09/272,504

[22] Filed: Mar. 19, 1999

[30] Foreign Application Priority Data

Mar. 26, 1998 [JP] Japan ................................ 10-078719

[51] Int. Cl.⁷ ........................................................ G02B 6/30
[52] U.S. Cl. ............................. 385/49; 385/48; 385/47; 385/45; 359/333
[58] Field of Search ........................ 385/49, 24, 122, 385/38, 47, 48, 33, 39, 92, 14, 15, 2, 45, 31, 34, 65, 83, 88, 89, 93, 131, 132; 359/127, 163, 173, 333; 250/201.1, 227.11; 372/50

[56] References Cited

U.S. PATENT DOCUMENTS

| | | | |
|---|---|---|---|
| 5,170,451 | 12/1992 | Ohshima | .................................. 385/43 |
| 5,500,763 | 3/1996 | Ota | ........................................... 359/333 |
| 5,757,995 | 5/1998 | Chen et al. | ................................ 385/45 |

FOREIGN PATENT DOCUMENTS

| | | |
|---|---|---|
| 0 219 906 | 4/1987 | European Pat. Off. . |
| 43 22 734 A1 | 1/1995 | Germany . |
| 58-191543 | 11/1983 | Japan . |
| 3-188402 | 8/1991 | Japan . |
| 8-334644 | 12/1996 | Japan . |

*Primary Examiner*—Phan T. H. Palmer
*Attorney, Agent, or Firm*—Dike, Bronstein, Roberts & Cushman, LLP; David G. Conlin

[57] ABSTRACT

A two-way optical communication module includes a main waveguide which is optically coupled to an optical fiber and directs light incident from the optical fiber to a light-receiving element and a sub waveguide which is optically coupled to the side of the main waveguide and directs light emitted from a light-emitting element to the optical fiber so as to carry out an efficient two-way optical communication by using one optical fiber without the necessity for an optical branch device. With this arrangement, it is possible to provide an inexpensive and small-sized two-way optical communication module which readily enables an integration with other elements so as to exhibit suitability for a small-scale network, and to provide a two-way optical communication link which uses the two-way optical communication module.

27 Claims, 13 Drawing Sheets

TWO-WAY OPTICAL COMMUNICATION DEVICE AND TWO-WAY OPTICAL COMMUNICATION APPARATUS

FIELD OF THE INVENTION

This invention relates to a two-way optical communication device which is capable of two-way transmission and reception of an optical signal, more specifically, the two-way communication device for home communication, communication between electronic devices, a LAN(Local Area Network), etc. that adopts a multimode optical fiber such as a plastic optical fiber as a transmitting medium, and this invention further concerns a two-way optical communication apparatus which uses the two-way communication device.

BACKGROUND OF THE INVENTION

Conventionally, as a two-way optical communication apparatus, the following two-way optical communication links have been known: a single-mode optical fiber which transmits single-mode light and serves as a transmitting medium, and a multimode optical fiber which transmits multimode light and serves as a transmitting medium.

An example of the single-mode optical fiber is a quartz glass optical fiber whose core is made of quartz glass. A loss caused by the quartz glass optical fiber is so small that transmission is possible over a long distance at high speed. The quartz glass optical fiber is coupled to an optical transmit/receive module(two-way optical communication device) so as to be widely used for the two-way optical communication link such as a LAN that is based on an ATM(asynchronous transmission mode).

However, the cost of the quartz glass optical fiber is high, the single-mode optical fiber needs to have a small diameter of merely several μm in view of a problem on manufacturing, and furthermore, it is difficult and time-consuming to adjust a coupling to the optical transmit/receive module, resulting in an increase in cost. Consequently, it is difficult to adopt the quartz glass optical fiber for a small-scale network such as a home network.

Meanwhile, examples of a multimode optical fiber are fibers including the quartz glass optical fiber and a plastic optical fiber(hereinafter, abbreviated as POF) whose core is made of plastic. Under the present circumstances, it is difficult for the POF to make a transmission over a long distance because of its relatively great transmission loss; however, the materials are inexpensive, the bending loss is small, resistance to cracking is offered, and a fiber with a large diameter of approximately 1 mm can be easily manufactured. Therefore, the POF makes it easy to adjust the coupling to the optical transmit/receive module and to reduce the cost of installing; consequently, the POF is suitable for a small-scale network such as a home network.

FIG. 22 illustrates an example of the two-way optical communication link which includes the POF serving as a medium. Here, two POFs 102 are respectively provided for transmission and reception. As a light-emitting element 107 on the transmitting side, an LED or a semiconductor laser is adopted and is coupled to the POF 102 directly or via a lens. on the receiving side, a photodiode is used as a light-receiving element 106 so as to receive light transmitted from the POF 102.

Such a two-way optical communication link has an advantage of easily adjusting the light-receiving elements 106 and the light-emitting elements 107 with the POFs 102 by making use of the large core diameters of the POFs 102. However, this arrangement requires two POFs 102, thereby increasing the cost in the case of transmission over a long distance.

Further, Japanese Laid-Open Patent Publication No. 191543/1983 (Tokukaisho 58-191543) discloses an optical transmit/receive module which is capable of two-way communication by using one optical fiber. As shown in FIG. 23, the optical transmit/receive module has a construction in which (a)a light-emitting element 207 which has a round light-emitting surface for launching light into an optical fiber 202 and (b) a ring-shaped light-receiving element 206 for receiving light incident from the optical fiber 202 are concentrically formed, an insulating space 210 being provided therebetween.

With the above-mentioned arrangement, upon transmitting, light emitted from the light-emitting element 207 is directly transmitted to the optical fiber 202, and upon receiving, light incident from the optical fiber 202 is received by the light-receiving element 206; therefore, it is possible to transmit and receive light merely with one optical fiber 202.

However, the optical transmit/receive module which is provided with the light-emitting element 207 at the center of the light-receiving element 206 causes the following problems: the light-emitting element 207 or the light-receiving element 206 is adversely affected due to heat of the light-emitting element 207, and for example, a stray light, which is transmitted from the light-emitting element 207 and is reflected on the incident surface of the optical fiber 202, may easily enter the light-receiving element 206, resulting in degradation in sensitivity to reception.

Moreover, the above-mentioned optical transmit/receive module requires a face-emitting type of the light-emitting element 207 due to a structural constraint; however, in the case of a face-emitting type of the LED, it is difficult to increase the speed. Furthermore, with regard to the semiconductive laser which is capable of increasing the speed, the face-emitting type has not been put into practical use; therefore, this arrangement offers drawbacks with reliability and cost.

Further, as shown in FIG. 24, a method in which a half mirror 310 separately handles transmitted light and received light has been known. With this method, by changing the incident angle with the half mirror 310, light emitted from a light-emitting element 307 enters into an optical fiber 302, and light incident from the optical fiber 302 passes through the half mirror 310 and is received on a light-receiving element 306; therefore, it is possible to transmit and receive light merely with one optical fiber 302.

However, in the method in which the half mirror 310 separately handles transmitted light and received light, with regard to the transmitted light and the received light, a loss of approximately 3dB occurs on the half mirror 310 and it is difficult to adjust an optical axis; consequently, this method tends to decrease the reliability on transmission and reception of light.

In addition to the aforementioned methods, another method which transmits and receives light by using one optical fiber adopts an optical branch path of an optical waveguide. For the optical waveguide, materials such as glass, a semiconductor, and a plastic are now under study. Thanks to its small loss, a glass optical waveguide is used for the optical transmit/receive module with the single-mode optical fiber serving as the transmitting medium. Further, as disclosed in Japanese Laid-Open Patent Publication No.

188402/1991 (Tokukaihei 3-188402), a plastic optical waveguide can be easily worked and can be handled in a relatively simple way, thereby receiving attention as a substitute for the glass optical waveguide.

However, it is difficult to work on a thick film of the glass optical waveguide; thus, in the case when the glass optical waveguide is coupled to the multimode optical fiber such as the POF with a large diameter, the coupling loss increases. Moreover, with regard to the plastic optical waveguide which is available for the optical transmit/receive module being appropriate for coupling to the multimode optical fiber, no publication has been disclosed yet.

Meanwhile, Japanese Laid-Open Patent Publication No. 334644/1996 (Tokukaihei 8-334644) discloses an optical branch device made of plastic. As shown in FIG. 25, the optical branch device is constituted by a clad 410 which is composed of a single molded body made of resin, and a core 403 which branches into not less than two paths in the clad 410. In the optical branch device, the end of the core 403 is coupled to the POF so that light incident from the POF propagates through the core 403 and branches off a branching portion 414 before having been launched.

Such a plastic optical branch device makes it easy to form the core 403 having the same size as the core diameter of the POF and provides a high-efficiency coupling to the multimode optical fiber such as the POF that has a large core diameter.

However, in such a plastic optical branch device, the incident light is divided into virtually equal amounts at the branching portion 414 so that in the case when the plastic optical branch device is used as the optical transmit/receive module, the amount of received light is reduced in half. Therefore, this arrangement causes degradation in quality for reproducing a signal from the received light and a reduction in the reliability. In addition, the core 403 and the clad 410 are formed by using a molding operation; thus, it is difficult to achieve an integration with the light-receiving element and the light-emitting element, and to design a smaller version.

SUMMARY OF THE INVENTION

The present invention is devised in order to solve the above-mentioned problems. The objective is to provide a two-way optical communication device in which, unlike an optical branch device, incident light is transmitted to a light-receiving element with high efficiency, light emitted from a light-emitting element is transmitted to an optical fiber with high efficiency, a simple adjustment enables a coupling to a multimode optical fiber such as a POF having a relatively large core diameter with small loss, a two-way optical communication is achieved with one optical fiber, the transmission loss is small, the sensitivity to reception is high, the effect caused by stray light is small, and suitability for a small-scale network is exhibited; and to provide a two-way optical communication apparatus which uses the two-way optical communication device.

Further, another objective of the present invention is to provide the two-way optical communication device in which a coupling is readily provided between a light-emitting element and an optical waveguide, an inexpensive and small version is achieved, an integration with other elements is readily possible, and suitability for a small-scale network is exhibited; and to provide a two-way optical communication apparatus which uses the two-way optical communication device.

In order to achieve the above-mentioned objectives, a two-way optical communication device of the present invention, which carries out a two-way optical communication with an optical fiber, includes a main waveguide which is optically coupled to the optical fiber and directs light incident from the optical fiber to a light-receiving element, and a sub waveguide which is optically coupled to the side of the main waveguide with regard to an optical axis direction thereof and directs light emitted from the light-emitting element to the optical fiber.

With the above-mentioned arrangement, the sub waveguide is coupled to the side of the main waveguide so as to have the optical axis which is different from that of the main waveguide, and light incident from the optical fiber cannot be readily coupled to the sub waveguide so as to be efficiently directed to the main waveguide and be coupled to the light-receiving element.

Meanwhile, light emitted from the light-emitting element is directed to the sub waveguide so as to be coupled to the main waveguide and is efficiently coupled to the optical fiber from the main waveguide. (or the light is directly coupled to the optical fiber instead of the main waveguide.)

Therefore, the aforementioned arrangement makes it possible to carry out a two-way optical communication with one optical fiber.

Further, with the aforementioned arrangement, a conventional optical branch device is not necessary and branch loss of received light is small. Therefore, it is possible to improve quality of a signal reproduced from incident light and to consequently improve reliability of the optical communication.

Furthermore, the light-emitting element and the light-receiving element are separately disposed on ends of different waveguides so that heat of the light-emitting element does not effect on the light-receiving element and it is possible to prevent a part of emitted light, which is reflected as stray light, from degrading sensitivity to reception.

Moreover, a face-emitting type of the light-emitting element is not necessary so that it is possible to adopt a reliable and low-cost semiconductor laser as the light-emitting element.

Additionally, another two-way optical communication device of the present invention, which carries out a two-way communication with an optical fiber, includes a main waveguide which is optically coupled to the optical fiber and directs light incident from the optical fiber to a light-receiving element, a first sub waveguide which is optically coupled to the side of the main waveguide with regard to the optical axis direction thereof and directs light emitted from a first light-emitting element to the optical fiber, and a second sub waveguide which is optically coupled to the side of the main waveguide with regard to the optical axis direction thereof and directs light emitted from a second light-emitting element to the optical fiber, the first and second light-emitting elements emitting light with different wavelengths.

With the above-mentioned arrangement, it is possible to carry out a wavelength multiplex communication with one optical fiber by using a plurality of sub waveguides so that high-density information, namely, more pieces of information can be transmitted and received via the optical fiber.

The two-way optical communication device of the present invention preferably emits light with a wavelength which is different from that of the two-way optical communication device disposed on the other end of the optical fiber.

With the above-mentioned arrangement, the wavelengths of incident light and emitted light are different from each other so that it is easy to discriminate between incident light and stray light which is emitted light partly reflected so as to be directed from the sub waveguide to the main waveguide, a full-duplex two-way optical communication can be carried out with one optical fiber, and it is possible to increase the transmitting speed of the two-way optical communication.

In order to achieve the above-mentioned objectives, a two-way optical communication apparatus of the present invention which carries out a two-way optical communication with an optical fiber, includes an optical fiber and a plurality of two-way optical communication devices having a main waveguide which is optically coupled to the optical fiber and directs light incident from the optical fiber to a light-receiving element, and a sub waveguide which is optically coupled to the side of the main waveguide with regard to the optical axis direction thereof and directs light incident from a light-emitting element to the optical fiber, the two-way optical communication devices being disposed on respective ends of the optical fiber.

With the above-mentioned arrangement, the sub waveguide is coupled to the side of the main waveguide so as to have an optical axis which is different from that of the main waveguide, and light incident from the optical fiber cannot be readily coupled to the sub waveguide so as to be efficiently directed to the main waveguide and coupled to the light-receiving element.

Meanwhile, light emitted from the light-emitting element is directed by the sub waveguide so as to be coupled to the main waveguide and is efficiently coupled to the optical fiber from the main waveguide.

Therefore, the aforementioned arrangement makes it possible to efficiently carry out a two-way optical communication with one optical fiber.

Further, with the aforementioned arrangement, a conventional optical branch path is not necessary, and branching loss of received light is small. Therefore, it is possible to improve quality of a signal reproduced from incident light and consequently to improve reliability.

Furthermore, the light-emitting element and the light-receiving element are separately disposed on ends of different waveguides so that heat of the light-emitting element does not effect on the light-receiving element and it is possible to prevent a part of emitted light, which is reflected as stray light, from degrading sensitivity to reception.

Moreover, a face-emitting type of the light-emitting element is not necessary so that it is possible to adopt a reliable and low-cost semiconductor laser as the light-emitting element.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) is a side view, and FIG. 7(b) is a schematic sectional view taken along line B—B shown in the side view.

FIG. 8(a) is a side view, and FIG. 8(b) is a schematic sectional view taken along line C—C shown in the side view.

DESCRIPTION OF THE EMBODIMENTS

EMBODIMENT 1

Referring to FIGS. 1 through 19, the following explanation describes a first embodiment of the present invention.

Figure 2:
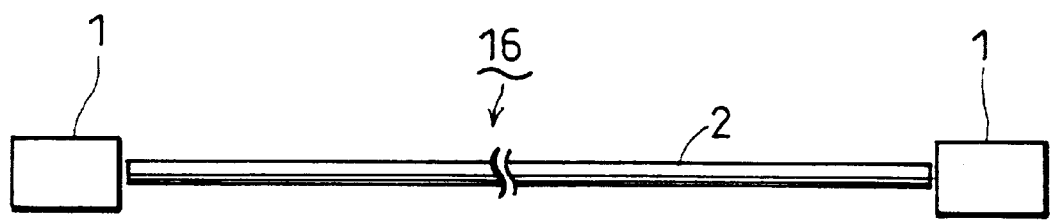
FIG. 2 is a schematic drawing which shows the two-way optical communication module.

FIG. 2 schematically shows the construction of a two-way optical communication link(two-way optical communicating apparatus) in accordance with the first embodiment. A two-way optical communicating link 16 is provided with(a) a cord-shaped optical fiber 2 for providing two-way transmission of light, which is modulated so as to be suitable for transmitting, in accordance with a data signal to be transmitted, and (b) optical transmit/receive modules (two-way optical communicating devices)1 which is connected so as to be optically coupled to the respective ends of the optical fiber 2.

The optical fiber 2 is provided with a core which is positioned at the center with an optically transmitting property and which has a round shape in cross section with regard to the direction orthogonally to an optical axis, and a clad which covers the core with virtually the even thickness and has an optically transmitting property. Therefore, the optical axis of the core virtually corresponds to the core of the optical fiber 2.

The refractive index of the core is set larger than that of the clad. With regard to such an optical fiber 2, from the viewpoint of geometrical optics, the refractive index difference between the core and the clad is set so as to allow light traveling from the core toward the clad to be totally reflected. Thus, light is totally reflected on the boundary between the core and the clad. Therefore, light propagating through the core is enclosed in the core so as not to leak(diverge); consequently, this arrangement allows the optical fiber 2 to transmit light such as modulated light from one end to the other of the optical fiber 2 with small loss.

Figure 1:
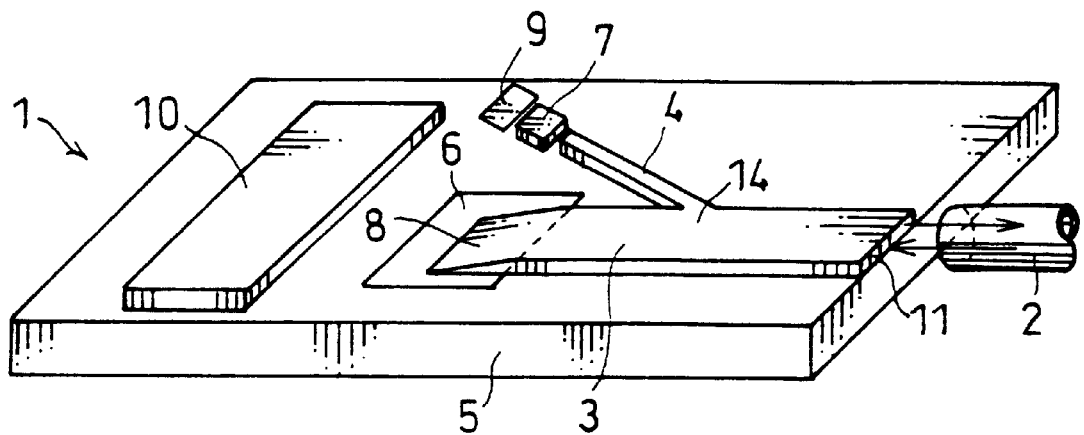
FIG. 1 is a perspective drawing which schematically shows a first embodiment of a transmit/receive module of a two-way optical communication apparatus in accordance with the present invention.

As shown in FIG. 1, the optical transmit/receive module 1 is constituted by a light-emitting element 7 for generating the modulated light, a light-receiving element 6 for receiving the modulated light from the optical fiber 2 so as to generate a data signal, a main waveguide 3, which has a parallelepiped shape(rectangular shape) and an optically transmitting property, for propagating light incident from the optical fiber 2 to the light-receiving element 6, and a sub waveguide 4, which has a parallelepiped shape and an optically transmitting property, for transmitting light emitted from the light-emitting element 7 via the main waveguide 3 to the optical fiber 2.

The light-emitting element 7, the light-receiving element 6, the main waveguide 3, and the sub waveguide 4 are formed so as to be integrated with a control device 10 for respectively controlling the light-receiving element 6 and the light-emitting element 7 and a monitoring photodiode 9 for monitoring the output of the light-emitting element 7 on a substrate 5 which is made of materials such as silicon by using the following semiconductor process.

The end face along the length of the optical fiber 2 is closely opposed to a main-waveguide end face 11 positioned on the opposite side of the emitting side of the main waveguide 3 that is optically coupled to the light-receiving portion of the light-receiving element 6, so that the optical fiber 2 is optically coupled to the main waveguide 3. Therefore, the main waveguide 3 is arranged so that the direction of the length of the main waveguide 3 is virtually positioned along the optical axis direction of light which travels from the optical fiber 2 through the main waveguide 3.

Further, the sub waveguide 4 is provided with the light-emitting element 7 which is optically coupled to one end face along the length of the sub waveguide 4. The other end face of the sub waveguide 4 is coupled to the main waveguide 3 on the side surface(side portion) thereof with regard to the optical axis direction of the main waveguide 3 so as to emit light transmitted from the light-emitting element 7 toward the main-waveguide end face 11. Here, the optical axis direction is an optical axis direction of light travelling from the optical fiber 2 to the light-receiving element 6. The optical fiber 2 is coupled to the main waveguide 3. The sub waveguide 4 is coupled to the main waveguide 3 between the light-receiving element 6 and the main-waveguide end face 11 of the main waveguide 3, for example, at the midpoint therebetween.

The light-emitting element 7 is controlled by the control device 10 so as to emit light to be transmitted. The light transmitted from the light-emitting element 7 is coupled to the sub waveguide 4 so as to propagate through the sub waveguide 4. And then, the light is coupled to the main waveguide 3 so as to propagate through the main waveguide 3. Furthermore, the transmitted light is coupled to the optical fiber 2 on the main-waveguide end face 11 and propagates through the optical fiber 2. A part of light emitted from the light-emitting element 7 is received by the monitoring photodiode 9 so as to be monitored. In accordance with the result of the monitoring, a feedback control adjusts the output of the light-emitting element 7 so as to keep even the intensity of light emitted from the light-emitting element 7.

Meanwhile, received light incident from the optical fiber 2 is coupled to the main waveguide 3 on the main-waveguide end face 11 so as to propagate through the main waveguide 3. And then, the light is coupled to the light-receiving element 6 via an optical coupler 8 so as to be converted into an electric signal. Afterwards, the electric signal is decoded into a data signal in the control device 10.

With the present embodiment, the sub waveguide 4 is coupled to a portion on the side surface of the main waveguide 3 so as to realize an optical two-way transmission and reception of light with one optical fiber 2. Therefore, the conventional optical branch path is omitted so that it is possible to achieve the high-efficiency optical transmit/receive module 1 and two-way optical communication link 16 which are able to reduce branch loss of the received light.

Moreover, a cross-sectional area with regard to the direction orthogonal to the optical axis of the main waveguide 3 is arranged so as to be larger than a cross-sectional area with regard to the direction orthogonal to the optical axis of the sub waveguide 4. Thus, when the received light travels from the optical fiber 2 to the main waveguide 3, it is possible to reduce the amount of light propagated to the sub waveguide 4 at a coupling portion 14 positioned between the main waveguide 3 and the sub waveguide 4; consequently, light can be received with high efficiency. Furthermore, light transmitted from the light-emitting element 7 has modes the number of which is smaller than that of received light so that it is possible to propagate light with small loss despite of the small cross-sectional area of the sub waveguide 4.

Additionally, it is desirable to set the number of modes of light propagating through the main waveguide 3 larger than that of light propagating through the sub waveguide 4. The optical fiber 2 which propagates multimode light contains a number of modes. Therefore, in the same manner, the number of modes of the main waveguide 3 increases so as to couple the optical fiber 2 and the main waveguide 3 with high efficiency.

Meanwhile, it is desirable to arrange the sub waveguide 4 so as not to readily allow the entry of the received light and so as to efficiently propagate light transmitted from the light-emitting element 7. The light-emitting element 7 such as a semiconductor laser has a smaller number of modes; thus, it is readily possible to set the number of modes of the sub waveguide 4 smaller than that of the main waveguide 3. On the other hand, this arrangement regulates light which is directed to the main waveguide 3 and is directed to the sub waveguide 4, due to the large number of modes; therefore, the received light can efficiently propagate through the main waveguide 3 to the light-receiving element 6, and transmitted light can efficiently propagate to the main waveguide 3.

It is possible to set an arbitrary number of modes in accordance with a cross-sectional area of each core layer (core portion) of the main waveguide 3 and the sub waveguide 4, and the refractive index difference between the core layer and the clad portion. Further, with regard to the optical fiber 2, for example, even when light with a low mode(small number of modes) such as semiconductor laser enters, the light varies the number of modes in accordance with the property of the optical fiber 2 while propagating through the optical fiber 2.

With the multimode optical fiber 2(especially, a plastic optical fiber) which is used for the present invention, light propagating through the optical fiber 2 contains a large number of modes. Therefore, although the number of modes is small before transmission, light transmitted from the optical transmit/receive module 1 increases the number of modes while propagating through the optical fiber 2.

In the present invention, for example, the width of the sub waveguide 4 is set at approximately 50 $\mu$m; meanwhile, the core diameter of the optical fiber 2 is set at approximately 1 mm; thus, with regard to light which is incident from the optical fiber 2 and propagates through the main waveguide 3, the number of modes is larger than that of light propagating from the sub waveguide 4 to the main waveguide 3.

As the optical fiber 2, the multimode optical fiber such as a POF is adopted. The core of the POF is made of plastic such as PMMA(PolyMethylMethAcrylate) and polycarbonate that is superior in an optically transmitting property. The clad is made of plastic whose refractive index is lower than that of the core.

This optical fiber 2 allows the core diameter to be set at between approximately 200 $\mu$m and 1 mm so that it is possible to set the diameter larger as compared with the case of a quartz optical fiber which is a single-mode optical fiber. The POF whose core is made of PMMA exhibits the highest transmitting rate at a wavelength in the vicinity of 650 nm, and the POF whose core is made of polycarbonate exhibits the highest transmitting rate at a wavelength in the vicinity of 780 nm.

As compared with the quartz optical fiber, the POF has a large transmission loss; however, thanks to the small bending loss, resistance to bending, and ability to easily manufacture a fiber with a large diameter, it is easy to adjust the coupling with the optical transmit/receive module 1, and the two-way optical communication link 16 can be obtained at low cost.

As the light-emitting element 7, it is possible to adopt, for example, semiconductor laser for emitting coherent light that is made of a material selected from GaAlAs and GsInAlP, or a light-emitting diode(LED). Since it is difficult to communicate at high speed with the LED, the LED is available at the speed of not more than approximately 150 Mbps. Meanwhile, the semiconductor laser makes it possible to communicate by using a high band for a transmitting rate exceeding 150 Mbps. The semiconductor laser for generating wavelengths of 650 nm and 780 nm, that allows a high transmissivity of the POF core, is used for a digital versatile disk or CD(compact disk) and is highly reliable at low cost.

Therefore, a core material of the optical fiber 2 is decided in accordance with the wavelength used for the light-emitting element 7. In the case of the semiconductor laser with the wavelength of 650 nm, the POF whose core is made of PMMA is adopted. In the case of the semiconductor laser with the wavelength of 780 nm, the POF whose core is made of polycarbonate is adopted. Therefore, it is possible to achieve the highly reliable two-way optical communication link 16 which reduces transmission loss at low cost.

Furthermore, HPCF is also acceptable as the optical fiber 2. The HPCF includes a core made of quartz glass and a clad made of a hard polymer. The HPCF is therefore more expensive than the POF; however, the transmission loss is small and the transmission band is wide. The HPCF is used as a transmitting medium so as to obtain the two-way optical communication link for communicating over a long distance at higher speed. In this case, in view of transmissivity for each wavelength of the HPCF, it is desirable to adopt the light-emitting element 7 which has the wavelength of 780 nm or 850 nm.

As a light-receiving element 6, a photodiode is used, which converts the intensity of the incident modulated light into an electric signal and has high sensitivity within the wavelength range of the light-emitting element 7. For example, it is preferable to adopt photodiodes including a PIN photodiode made of materials such as silicon and an avalanche photodiode. Furthermore, the light-receiving element 6 can be formed so as to be embedded in the substrate 5.

Figure 3:
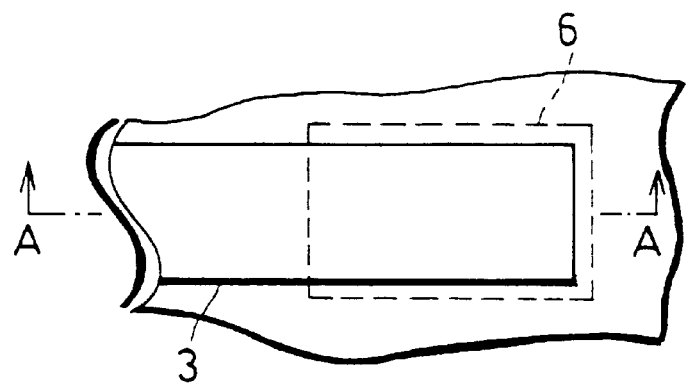
FIG. 3 is a plan view which shows an optical coupler of the optical transmit/receive module.
Figure 4:
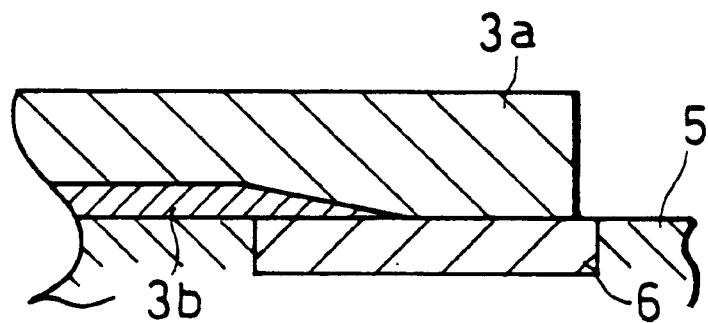
FIG. 4 is a schematic sectional view, which shows the optical coupler, taken along line A—A shown in FIG. 3.

The main waveguide 3 and the light-receiving element 6 are coupled to each other via the optical coupler 8. As shown in FIGS. 3 and 4, the optical coupler 8, for example, provides an optical coupling between the light-emitting element 6 embedded in the substrate 5 and the main waveguide 3 formed on the light-receiving surface. On the side of the main waveguide 3 that faces the substrate 5, a buffer layer 3b is formed as the clad portion in order to prevent light from leaking to the substrate 5. The buffer layer 3b is made of, for example, materials such as silicon oxide whose refractive index is lower than that of a core layer 3a.

Here, as shown in FIG. 4, on the light-receiving surface of the light-receiving element 6, the optical coupler 8 has a construction in which the buffer layer 3b is formed in a tapered shape so as to have a thickness which gradually becomes smaller along the traveling direction of received light, and the core layer 3a is formed so as to have a thickness which gradually becomes larger in order to make a complement to the thinner part. In the optical coupler 8, received light, which propagates through the main waveguide 3, leaks to the substrate 5 from the thinner part of the buffer layer 3b or the part on which no buffer layer 3b exists so that the received light is coupled to the light-receiving element 6. Here, for example, a reflection protection film made of materials such as silicon nitride is also allowed to be formed between the main waveguide 3 and the light-receiving element 6.

Such an optical coupler 8 makes it possible to efficiently couple light which has propagated through the main waveguide 3 to the light-receiving element 6. Further, the light-receiving element 6 is covered with the main waveguide 3 so that stray light cannot readily enter the light-receiving element 6. Furthermore, the light-receiving element 6 is embedded in the substrate 5, and the main waveguide 3 is formed thereon; thus, the light-receiving element 6 and the main waveguide 3 can be formed in accordance with a semiconductor manufacturing process, and it is possible to readily adjust the positions of the light-receiving element 6 and the main waveguide 3 with high precision. Moreover, it is possible to realize a smaller version of the optical transmit/receive module 1.

Figure 5:
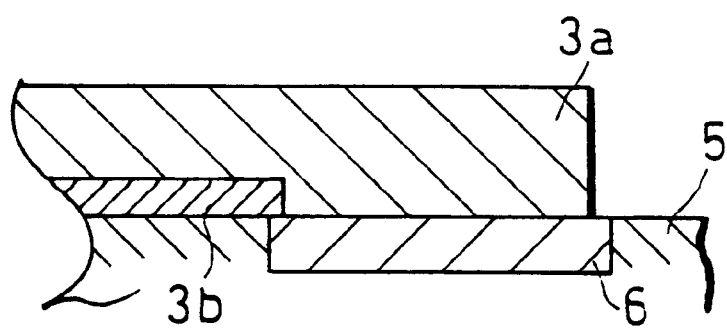
FIG. 5 is a sectional view which schematically shows an example of another arrangement of the optical coupler.

FIG. 5 shows another construction of the optical fiber 8, in which the buffer layer 3b is not formed into a tapered shape but is cut on the light-receiving element 6; namely, a part of the buffer layer 3b that has been cut is entirely replaced by the core layer 3a. The end face of the buffer 3b which has been cut is arranged so as to be orthogonal to the optical axis direction of the main waveguide 3.

Such a working can be easily performed on the buffer layer 3b in the direction orthogonal to the surface of the substrate 5 by using methods such as a reactive ion etching (RIE). This makes it possible to simplify the manufacturing process of the optical coupler 8. Moreover, the light-receiving element 6 is allowed to be coupled to the main waveguide 3 by using another method in which the optical fiber 8 is not used. For example, the light-receiving element 6 can be bonded to the end face of the main waveguide 3 that is arranged in the direction of the optical axis.

Figure 6:
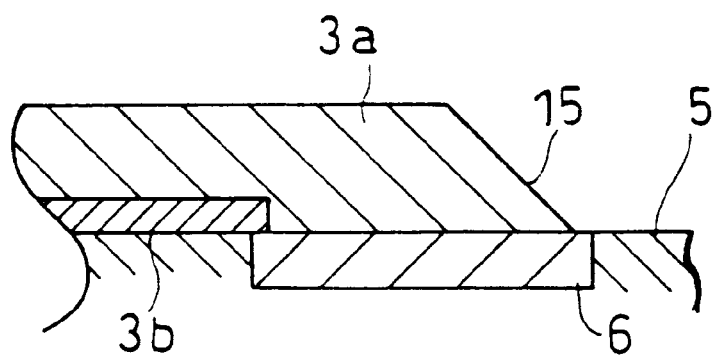
FIG. 6 is a sectional view which schematically shows a reflection portion of the optical coupler.

Further, as shown in FIG. 6, a reflection surface 15 is formed on the end face portion of the main waveguide 3(end face portion arranged in the optical axis direction of the main waveguide 3) so that light propagating through the main waveguide 3 is reflected on the reflection surface 15 to the light-receiving element 6 so as to be coupled to the main waveguide 3. When the light-receiving element 6 is coupled by using the methods shown in FIGS. 4 and 5, in some cases, light is not totally transmitted to the substrate 5 and a part of the light leaks by being emitted from the end face portion of the main waveguide 3. For this reason, as shown in FIG. 6, the reflection surface 15 forces light to be coupled to the light-receiving element 6; consequently, it is possible to improve the coupling efficiency.

As shown in FIG. 1, as the aforementioned monitoring photodiode 9, it is possible to adopt, for example, a PIN photodiode, etc. made of silicon. The monitoring photodiode 9 monitors light emitted from the back side of the light-emitting element 7(surface opposite to the surface for emitting light to the sub waveguide 4) so as to maintain the output of the light-emitting element 7 at a certain level. The monitoring photodiode 9 is also allowed to be embedded in the substrate 5. Further, the light-emitting element 7 and the monitoring photodiode 9 can be coupled to each other via a monitoring optical waveguide. The monitoring optical waveguide is used for coupling so that it is possible to reduce stray light occurring from the light-emitting element 7.

The control device 10 decodes an electric signal of light received on the light-receiving element 6 into a data signal, controls the output of the light-emitting element 7, and adjusts the output of the light-emitting element 7 in accordance with light for monitoring that is received on the monitoring photodiode 9.

All of the main waveguide 3, the sub waveguide 4, the light-receiving element 6, the light-emitting element 7 are allowed to be formed on the substrate 5. All these members are formed on the same substrate 5 so that it is possible to realize a smaller version of the optical transmit/receive module 1 and to manufacture them by one operation. Manufacturing by one operation makes it possible to improve the precision and the reliability. For the substrate 5, it is possible to adopt semiconductors made of materials including silicon and gallium arsenide, glass, and resin.

The following explanation describes the main waveguide 3 and the sub waveguide 4 in detail.

Figure 7A:
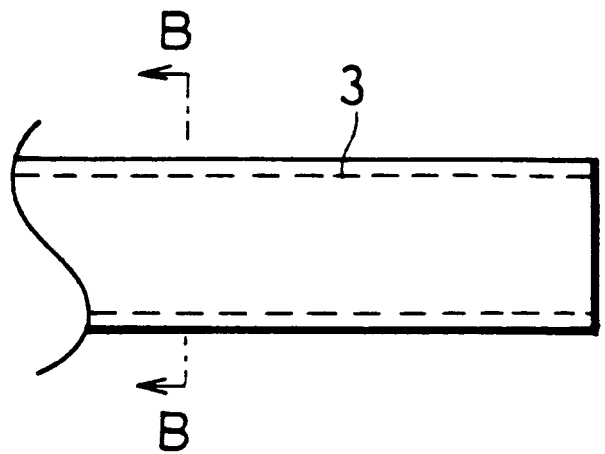
FIGS. 7(a) and 7(b) are explanatory drawings which show a main waveguide of the optical transmit/receive module.
Figure 7B:
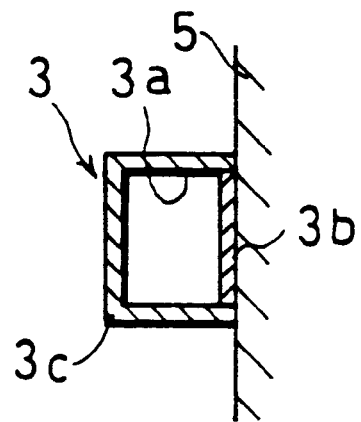

As shown in FIG. 7, the main waveguide 3 is, for example, formed into a rectangular shape on the substrate 5 and is provided with the core layer 3a and the buffer layer 3b which is formed between the core layer 3a and the substrate 5. The refractive index of the core layer 3a is smaller than that of the core layer 3a. Further, on the sides of the core layer 3a arranged in the direction of the optical axis, except for the side on which the buffer layer 3b is formed, an over clad layer 3c is allowed to be formed. The over clad layer 3c has a "]" shaped cross-sectional area with regard to the direction orthogonal to the optical axis and has a refractive index which is smaller than that of the core layer 3a. The sub waveguide 4 has the same construction as the main waveguide 3; thus, the explanation thereof is omitted.

Figure 8A:
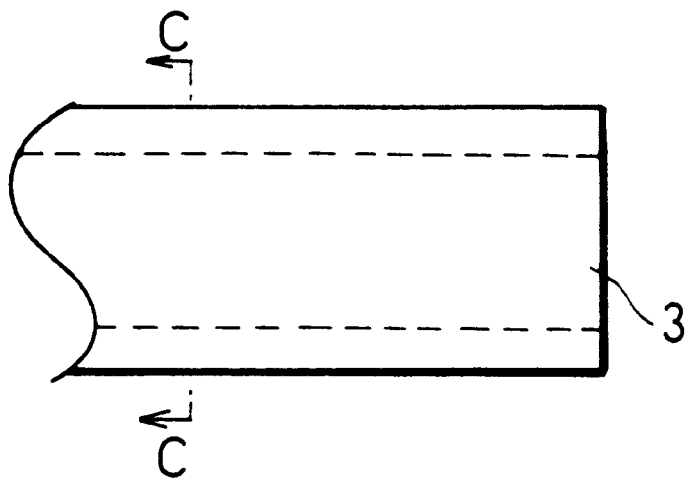
FIGS. 8(a) and 8(b) are explanatory drawings which show another main waveguide of the optical transmit/receive module.
Figure 8B:
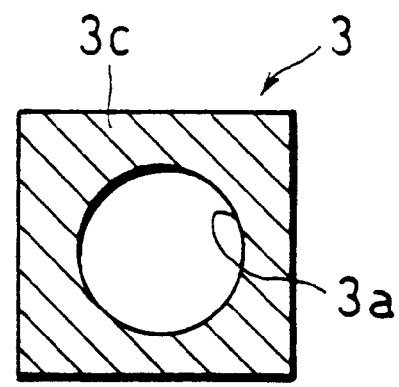

Furthermore, as shown in FIG. 8, the main waveguide 3 is, for example, formed by using a method such as a molding method instead of being formed on the substrate 5. In this case, the cross-sectional area of the core layer 3a of the main waveguide 3 is formed into a round shape so that it is possible to improve the efficiency of coupling to the optical fiber 2. Such a main waveguide 3 is provided with the over clad layer 3c on the rim of the core layer 3a. The sub waveguide 4 provided for the main waveguide 3 has the same construction as the main waveguide 3; thus, the explanation thereof is omitted. The core layer 3a is also allowed to be made of materials such as polyimide, PMMA, polycarbonate, and polystyrene, or to be made of plastics by using these materials as main components.

As compared with the optical waveguide made of quartz, the optical waveguide made of plastics makes it easy to form a thicker film. And it is possible to efficiently couple the optical waveguide made of plastics to the multimode optical fiber which has a large diameter. Furthermore, the optical waveguide made of plastics can be readily manufactured at low cost.

In the case when a semiconductive laser is used as the light-emitting element 7, during a bonding operation for the substrate 5, it is necessary to perform a heating operation at a temperature of approximately 300° C.; however, plastics generally cause a problem due to its low temperature resistance. Meanwhile, polyimide has a high heat resistance of not less than approximately 300° C. as compared with other plastics so that it is difficult for a heating operation to alter the quality. Furthermore, polyimide fluoride has a high transparency so as to reduce the transmission loss. For this reason, it is preferable to adopt polyimide for the core layer 3a. Specifically, products such as PIX or OPI(manufactured by Hitachi Chemical Co., Ltd.) can be adopted as polyimide.

For the buffer layer 3b and the over clad layer 3c, materials whose refractive indexes are smaller than that of the core layer 3a are adopted. For instance, materials such as silicon oxide and plastics are available. Moreover, for the over clad layer 3c, photoresist or thermosetting resin can be adopted.

Next, referring to FIG. 9, the following explanation describes the manufacturing method of the main waveguide 3 and the sub waveguide 4. The main waveguide 3 and the sub waveguide 4 can be manufactured by using the semiconductor process. An example of the manufacturing process is described as follows:

1) On the substrate 5 made of silicon, as the buffer layer 3b, silicon oxide is made into a film with the thickness of several μm by using a sputtering method. And then, photoresist is applied thereon, and a patterning operation is performed thereon by using photolithography. With photoresist serving as a mask, unnecessary portions of the buffer layer 3b are removed by the reactive ion etching(RIE) in which $CF_4$ gas is used(shown in FIG. 9(a)). The surface of the substrate 5 is previously subjected to a rubbing and polishing operation. On the substrate 5, the aforementioned light-receiving element and monitoring photodiode, and the wiring thereof are previously formed(not shown).

2) As the core layer 3a, polyimide(product name "PIX3400" manufactured by Hitachi Chemical Co., Ltd.) is applied on the substrate 5 by using a spin coat. Afterwards, baking operations are performed at temperatures of 130° C., 230° C., and 350° C. The film thickness of the core layer 3a is arranged so as to be approximately 40 μm after the baking operations (shown in FIG. 9(b)).

3) On the core layer 3a, a silicon oxide film 12, which serves as a mask of the core layer 3a, is formed with a thickness of approximately 1 by using the spattering method. Further, on the silicon oxide film 12, photoresist 13 is applied so as to serve as a mask of the silicon oxide film 12(shown in FIG. 9(c)).

Figure 9A:
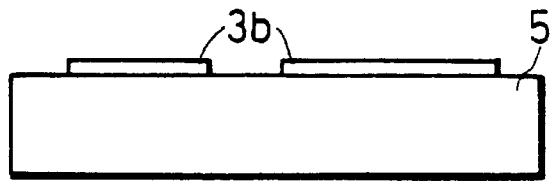
FIGS. 9(a) through 9(e) are process drawings which show an example of a manufacturing method of the main waveguide.
Figure 9B:
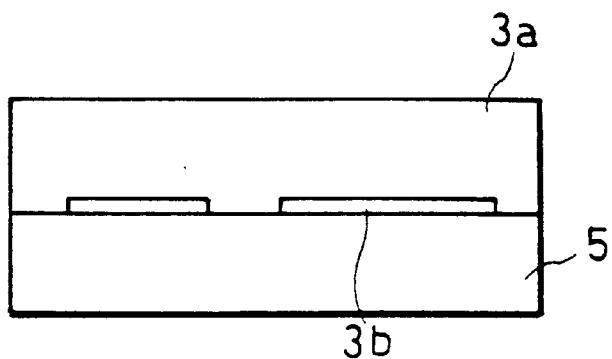
Figure 9C:
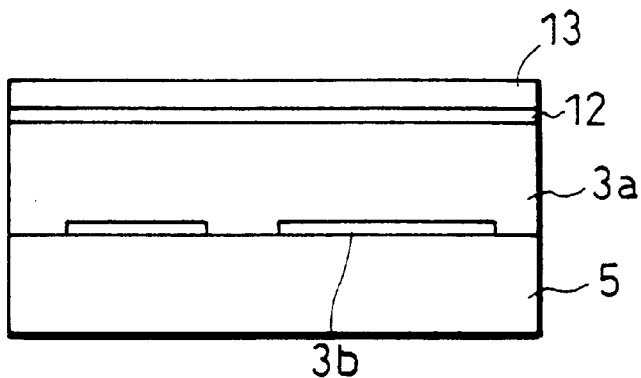
Figure 9D:
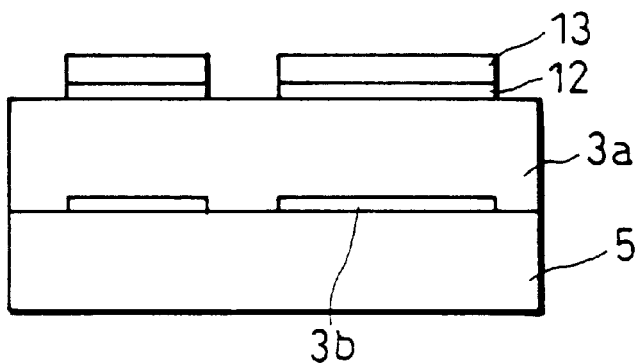
Figure 9E:
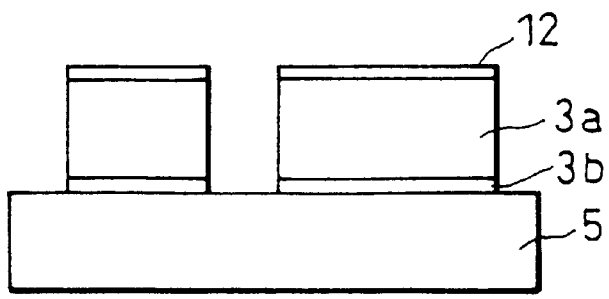

4) The photoresist 13 is patterned into the shapes of the main waveguide 3 and the sub waveguide 4 by using photolithography, and unnecessary portions of the silicon oxide film 12 are removed in accordance with the shapes of the main waveguide 3 and the sub waveguide 4 by using the RIE with $CF_4$ gas(shown in FIG. 9(d)).

5) And then, by using the RIE with oxygen gas, unnecessary portions of the core layer 3a are removed in accordance with the shapes of the main waveguide 3 and the sub waveguide 4. At this time, the photoresist 13 is also removed(shown in FIG. 9(e)). The silicon oxide film 12 cannot be removed but used as an upper clad. As a mask of the core layer 3a, in addition to the silicon oxide film 12, materials such as resist containing silicon and aluminum can be used; however, these materials tend to cause residues(remaining portions) due to the RIE using oxygen gas.

As described above, in the manufacturing process, the main waveguide 3 and the sub waveguide 4 are manufactured in accordance with the semiconductor process; thus, it is possible to realize a high-precision manufacturing process and coupling to the light-receiving element 6. Further, a plurality of optical transmit/receive modules 1 are manufactured on the substrate 5 by one operation so that it is possible to realize a low manufacturing cost. The aforementioned manufacturing method of the main waveguide 3 and the sub waveguide 4 is one of the examples; naturally, the method can be partially changed and another method is also available for manufacturing. For example, the main waveguide 3 and the sub waveguide 4 can be formed by using the molding operation.

Figure 10:
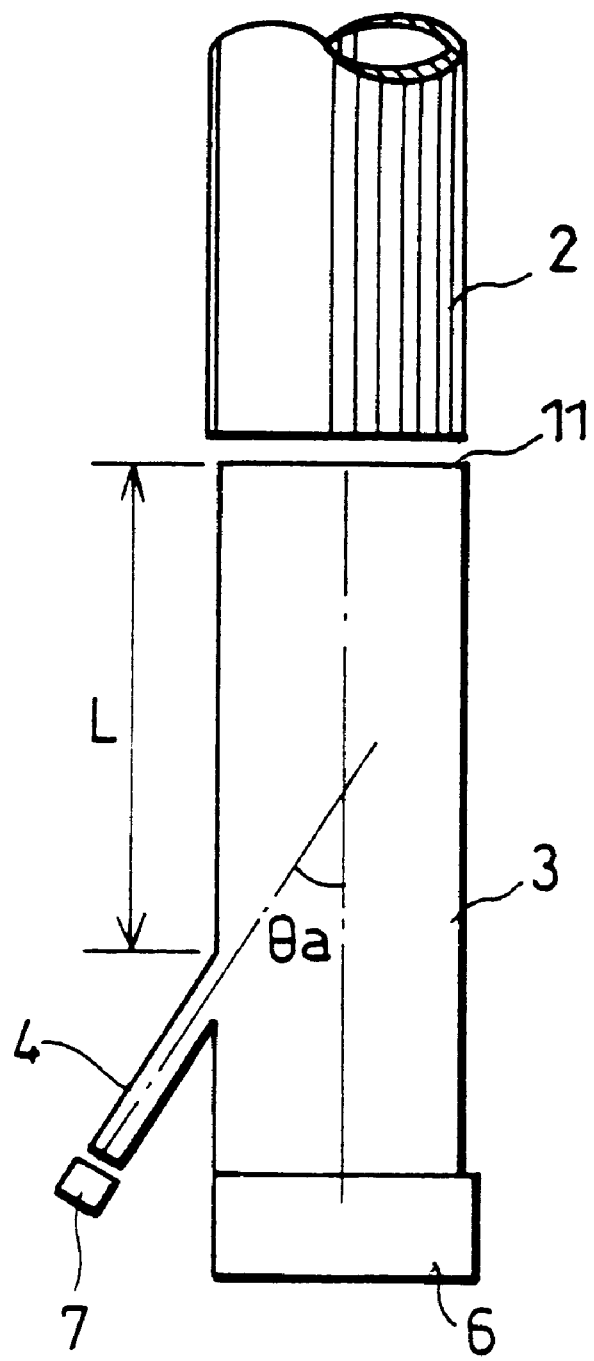
FIG. 10 is a schematic drawing which shows a positional relationship among the main waveguide, a sub waveguide, and an optical fiber of the optical transmit/receive module in accordance with the first embodiment.

Referring to FIG. 10, the following explanation describes the shapes of the main waveguide 3 and the sub waveguide 4. As illustrated in FIG. 10, the optical axis of the main waveguide 3 is virtually in parallel with the optical axis of the optical fiber 2. The optical axis of the sub waveguide 4 is arranged so as to be inclined by θa with regard to the optical axis of the main waveguide 3. The sub waveguide 4 is coupled to the main waveguide 3 at a distance L from the main-waveguide end face 11 of the main waveguide 3. The optical axis of the main waveguide 3 and the optical axis of the optical fiber 2 are arranged so as to be virtually in parallel with each other so that it is possible to efficiently couple light, which is incident from the optical fiber 2 to the main waveguide 3 and to reduce the transmission loss after the light has entered the main waveguide 3.

Meanwhile, the optical axis of the sub waveguide 4 is inclined with regard to the optical axis of the main waveguide 3 so that light which is incident from the optical fiber 2 and propagates through the main waveguide 3 cannot be readily coupled to the sub waveguide 4. Especially, the angle θa is arranged so as to be formed by the optical axis of the main waveguide 3 and the optical axis of the sub waveguide 4 so that it is possible to obtain the optical transmit/receive module 1 which causes smaller loss upon transmission and reception.

Figure 11:
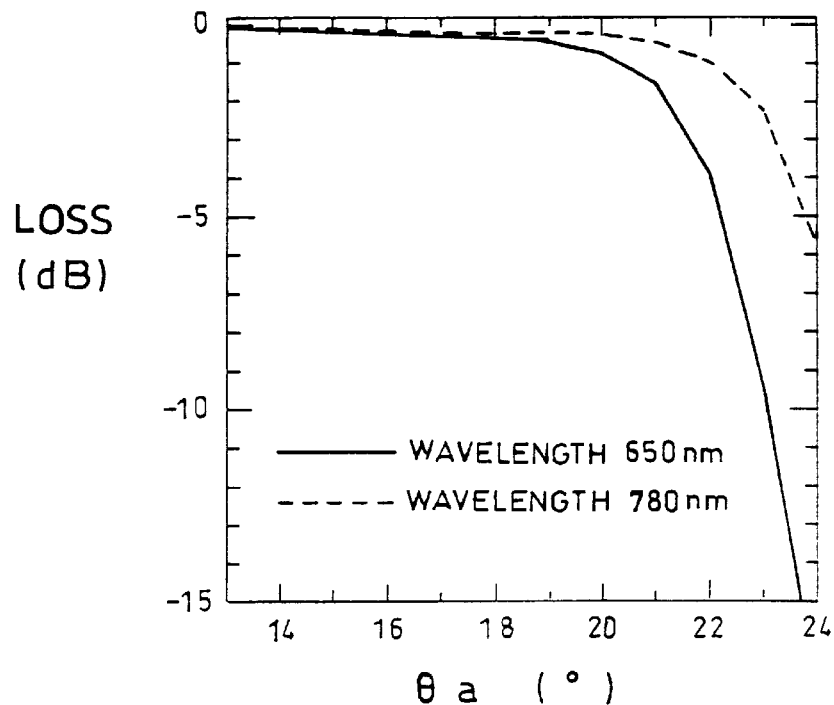
FIG. 11 is a graph which shows a relationship between loss of transmitted light and an angle θa formed by optical axes of the main waveguide and the sub waveguide.

FIG. 11 shows a result of calculation on a relationship between the angle θa and loss appearing after light emitted from the light-emitting element 7 has propagated through the sub waveguide 4 and has been coupled to the main waveguide 3. The calculation is performed by using a beam propagating method. Here, it is assumed that two kinds of semiconductor lasers are used as the light-emitting element 7: a semiconductor laser with a wavelength of 650 nm and a semiconductor laser with a wavelength of 780 nm. It is also assumed that the property of polyimide(product name "PIX" manufactured by Hitachi Chemical Co., Ltd.) is used for the main waveguide 3 and the sub waveguide 4, and silicon oxide is used for the buffer layer 3b and the over clad layer 3c. The width of the main waveguide 3 is 400 μm and the width of the sub waveguide 4 is 100 μm. The above-mentioned widths are arranged orthogonally to the optical axes of the main waveguide 3 and the sub waveguide 4 and in parallel with the surface of the substrate 5.

Light which is emitted from the light-emitting element 7 is coupled to the sub waveguide 4, propagates through the sub waveguide 4, and is coupled to the main waveguide 3. The transmission loss differs in accordance with a variation of the angle θa. As shown in FIG. 11, with regard to any one of the wavelengths, the transmission loss sharply increases when the angle θa exceeds 22°. For this reason, it is desirable to set the angle θa at not more than 22°. Further, the lengths of the main waveguide 3 and the sub waveguide 4 are arranged in such a state that the light-receiving element 6 and the light-emitting element 7 do not interfere with each other. Therefore, the larger the angle θa, it is possible to further reduce the lengths of the main waveguide 3 and the sub waveguide 4.

Figure 12:
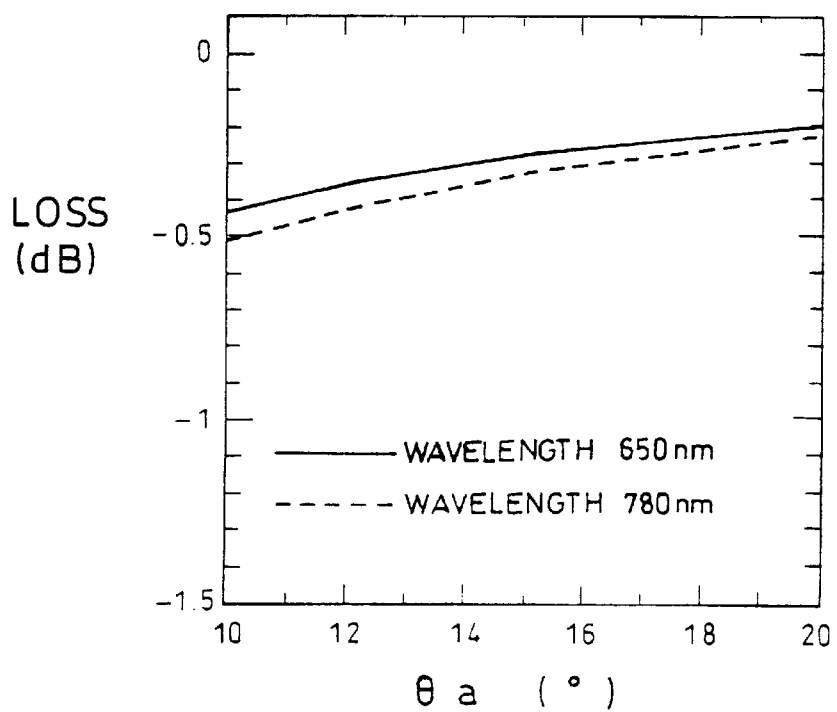
FIG. 12 is a graph which shows a relationship between loss of received light and an angle θa formed by optical axes of the main waveguide and the sub waveguide.

Meanwhile, light incident from the optical fiber 2 propagates through the main waveguide 3, and a part of the light is distributed to the sub waveguide 4 at the coupling portion 14. In order to increase the amount of light received by the light-receiving element 6, it is necessary to reduce the amount of light distributed to the sub waveguide 4. FIG. 12 shows a result of a calculation on a relationship between the angle θa and branch loss appearing upon propagating light from the main waveguide 3 to the sub waveguide 4. The calculation is performed by using the beam propagating method. Here, it is assumed that the conditions of the main waveguide 3 and the sub waveguide 4 are the same as those of calculation of FIG. 11. The smaller the angle θa, the loss appearing at the coupling portion 14 tends to increase.

However, within a 10° to 20° range of the angle θa, the loss is not more than 1 dB. As shown in FIG. 10, the main waveguide 3 is arranged in line with the optical fiber 2, and the sub waveguide 4 is coupled at somewhere along the main waveguide 3 so that it is possible to obtain the optical transmit/receive module 1 which causes smaller propagation loss upon transmission and reception.

Figure 13:
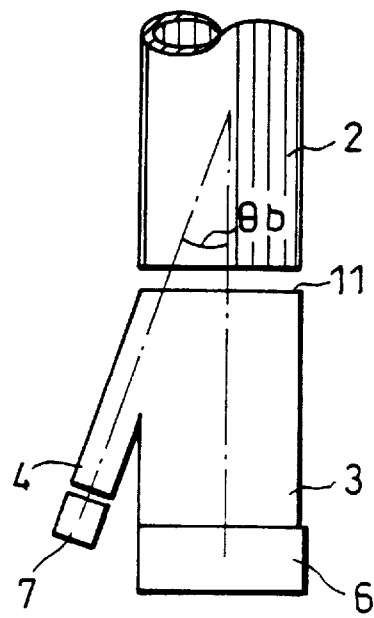
FIG. 13 is a schematic drawing which shows a positional relationship among the main waveguide, the sub waveguide, and the optical fiber of another optical transmit/receive module in accordance with the first embodiment.

The smaller the distance L between the main-waveguide end face 11 and the coupling portion 14, the shorter the length of the main waveguide 3 can be arranged; consequently, it is possible to realize a smaller version of the optical transmit/receive module 1. Further, the propagation loss(transmission loss) can be reduced in the main waveguide 3. As shown in FIG. 13, in the case when the distance L is short, for example, if the distance L is set at 0, transmitted light which propagates through the sub waveguide 4 is coupled to the optical fiber 2 in virtually a direct manner.

In general, the main waveguide 3 tends to cause large loss on the sides due to a problem of a manufacturing process. Therefore, in such a construction in which transmitted light is directly coupled to the optical fiber 2, it is possible to reduce the loss. In this case, the angle θb is formed by the optical axis of the sub waveguide 4 and the optical axis of the optical fiber 2 so as to further reduce the loss.

Figure 14:
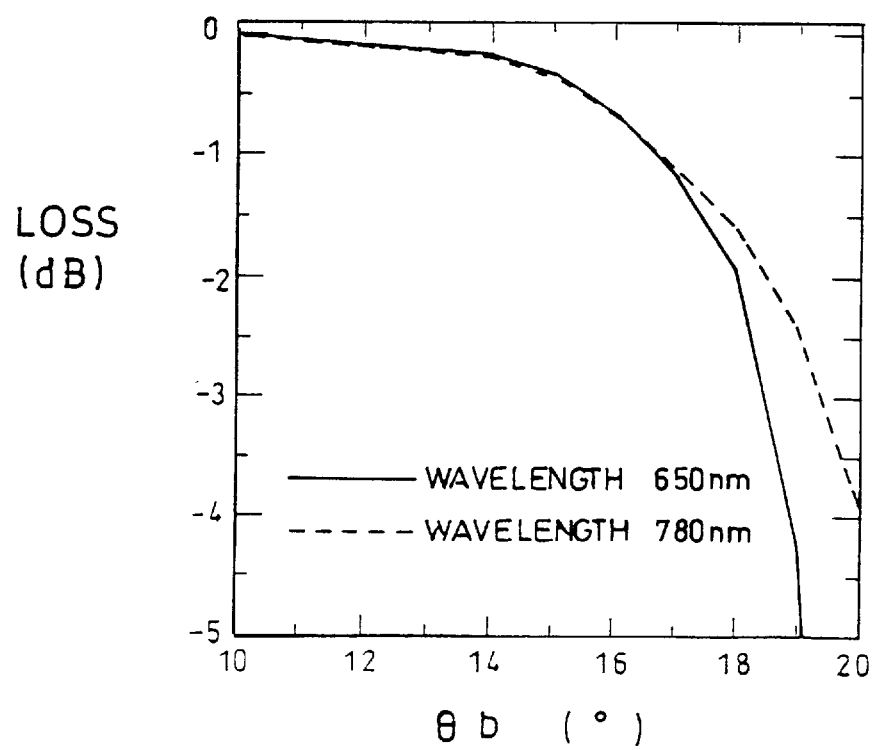
FIG. 14 is a graph which shows a relationship between loss of transmitted light and an angle θb formed by optical axes of the sub waveguide and the optical fiber.

FIG. 14 shows a result of a calculation on a relationship between the angle θb and loss appearing in the optical fiber 2 after light has entered the optical fiber 2. The calculation is performed by using the beam propagating method. Two kinds of combinations of the light-emitting element 7 and the optical fiber 2 are assumed: a semiconductor laser with a wavelength of 650 nm and a POF with a PMMA core, and a semiconductor laser with a wavelength of 780 nm and a POF with a polycarbonate core. Here, the core diameter of the optical fiber 2 is set at 500 μm, the width of the main waveguide 3 is set at 400 μm, and the width of the sub waveguide 4 is set at 100 μm.

Light which is emitted from the light-emitting element 7 is coupled to the sub waveguide 4, propagates through the sub waveguide 4, and is coupled to the optical fiber 2. At this time, the loss differs in accordance with a variation of the angle θb. As shown in FIG. 14, with regard to any combination, the loss sharply increases when the angle θb exceeds 170. For this reason, it is desirable to set the angle θb at not more than 170. Further, the lengths of the main waveguide 3 and the sub waveguide 4 are arranged in such a state that the light-receiving element 6 and the light-emitting element 7 do not interfere with each other. Therefore, the larger the angle θb, it is possible to further reduce the lengths of the main waveguide 3 and the sub waveguide 4.

Both of the main waveguide 3 and the sub waveguide 4 are formed in a straight line. These are formed in a straight line so as to reduce the transmission loss, and upon manufacturing, for example, upon manufacturing by using the semiconductor process, the main waveguide 3 and the sub waveguide 4 can be readily formed.

Figure 15:
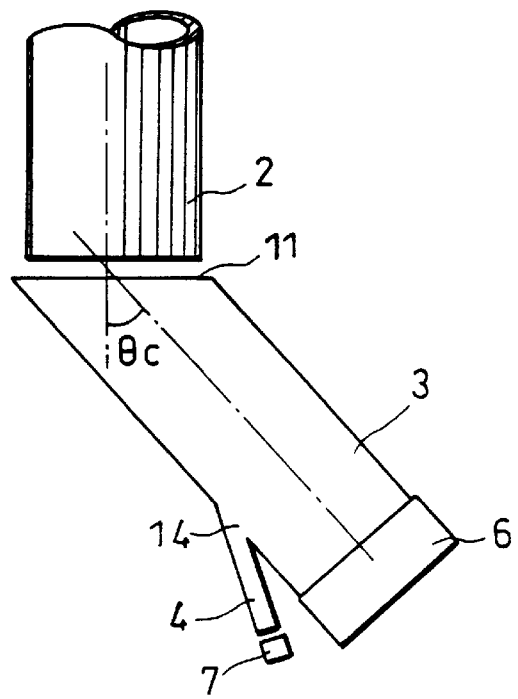
FIG. 15 is a schematic drawing of the optical transmit/receive module that shows a relationship between the optical axes of the main waveguide and the optical fiber.
Figure 16:
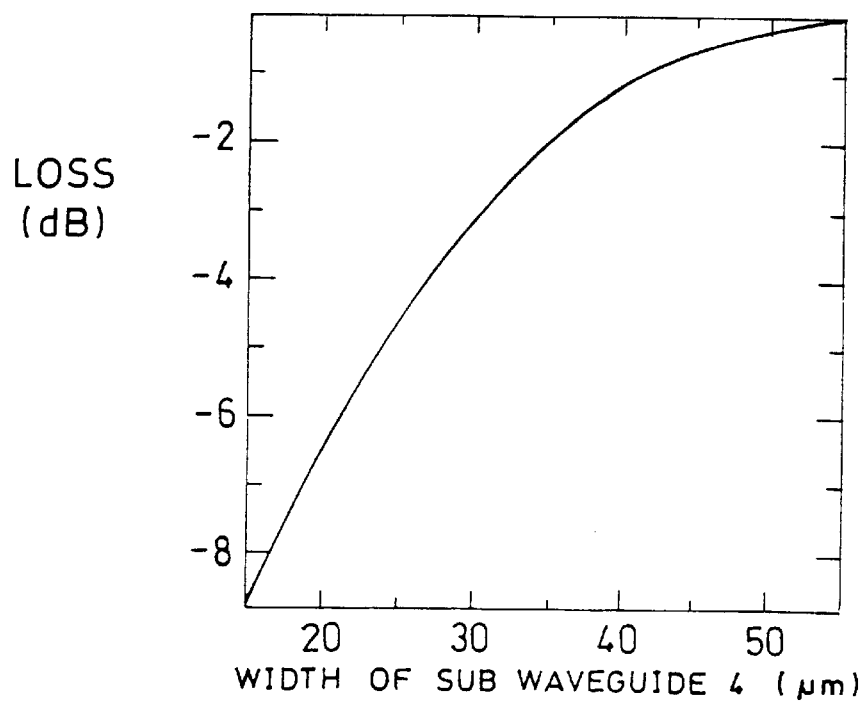
FIG. 16 is a graph which shows width dependence of the sub waveguide with regard to coupling efficiency between the sub waveguide and a light-emitting element of the optical transmit/receive module.
Figure 17:
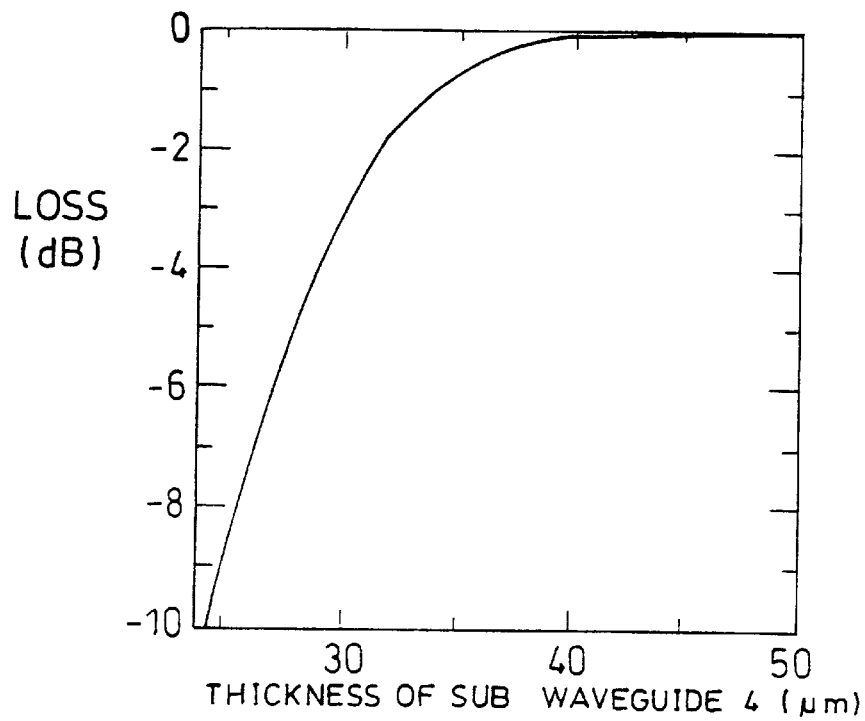
FIG. 17 is a graph which shows thickness dependence of the sub waveguide with regard to coupling efficiency between the light-emitting element and the sub waveguide.

In addition, FIG. 15 shows one example of a variation in which the optical axis of the main waveguide 3 is inclined by an angle θc with regard to the optical axis of the optical fiber 2. In this case, in order to reduce the loss of the transmitted light, the angle θc is set at not more than 17° in accordance with the same reason as that described referring to FIG. 14.

As described above, the optical axis of the main waveguide 3 is inclined with regard to the optical axis of the optical fiber 2 so that it is possible to set larger the cross-sectional area of the main-waveguide end face 11, and an efficient coupling to the optical fiber 2 can be realized. The width and thickness of the sub waveguide 4 is determined in accordance with the efficiency of coupling to the light-emitting element 7. With regard to the coupling efficiency of light emitted from the light-emitting element 7 and the sub waveguide 4, FIGS. 16 and 17 respectively show calculation results of the width and thickness dependence of the sub waveguide 4. Here, the thickness is measured orthogonally to the optical axes of the main waveguide 3 and the sub waveguide 4 and orthogonally to the surface of the substrate 5.

The calculation is performed by using a ray tracing method. Further, the calculation is performed on the assumption that semiconductor laser is used as the light-emitting element 7, an intensity distribution is a gauss distribution, a radiation angle (half band width) with regard to the direction orthogonal to the surface of the substrate 5 is 30°, and a radiation angle with regard to the direction parallel to the surface of the substrate 5 is 10°. Here, the distance between the light-emitting element 7 and the sub waveguide 4 is 30 μm, and the install accuracy of the light-emitting element 7 is ±15 μm both in the directions of the width and thickness of the sub waveguide 4.

Incidentally, in the case of coupling to a single-mode optical fiber, the accuracy needs to be not more than several μm; however, as described above, the accuracy within the range of ±15 μm allows the light-emitting element 7 to be readily installed.

The calculation is performed on the assumption that the axis is shifted to a maximum degree. If it is assumed that the tolerance of the coupling efficiency is 1 dB, referring to FIGS. 16 and 17, it is understood that the thickness needs to be not less than 35 μm and the width needs to be not less than 40 μm with regard to the sub waveguide 4. Namely, the thickness is set at not less than 35 μm and the width is set at not less than 40 μm with regard to the sub waveguide 4 so that it is possible to narrow a range of variation of loss even in the event of the shift of the axis of the light-emitting element 7. It is desirable that the thickness of the main waveguide 3 be arranged so as to be the same as that of the sub waveguide 4 in order to simplify the manufacturing process.

Figure 18:
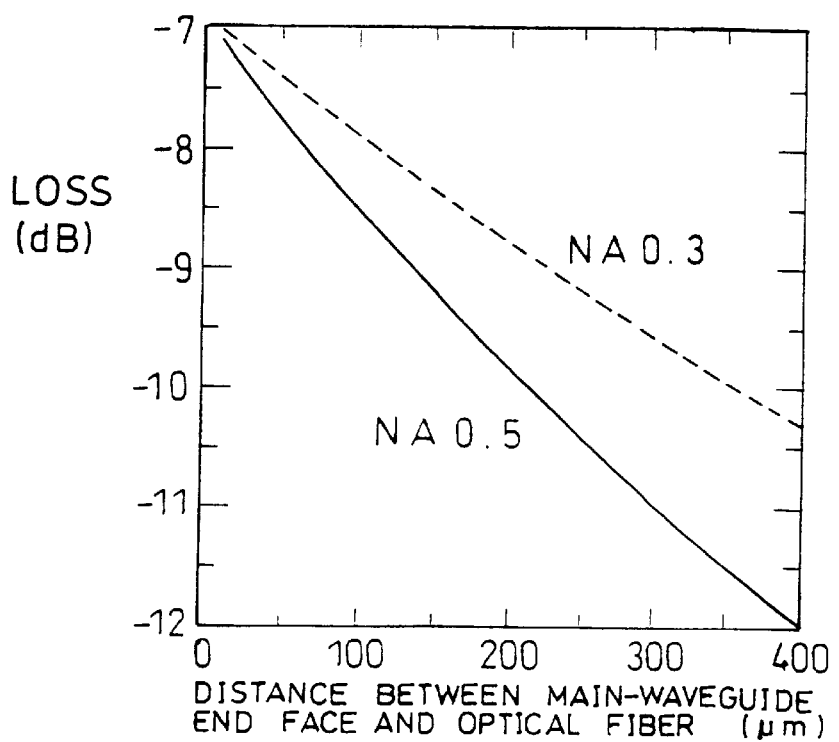
FIG. 18 is a graph which shows a relationship between loss in coupling an end face of the main waveguide to the optical fiber and a distance therebetween.

The following explanation describes the coupling between the main waveguide 3 and the optical fiber 2. With regard to the optical fiber 2 with a large diameter for transmitting multimode light, emitted light is not regarded as a point source; thus, it is difficult to gather light with a lens. Therefore, it is desirable to provide the coupling in a state in which the optical fiber 2 and the main waveguide 3 directly face each other; namely, each end face of them closely opposes to each other. FIG. 18 shows a calculation result on the relationship between the coupling loss and the distance between the optical fiber 2 and the main-waveguide end face 11.

The total amount of loss is determined by adding (a) the coupling loss of received light travelling from the optical fiber 2 to the main waveguide 3 and (b)the coupling loss of the transmitted light travelling from the main waveguide 3 to the optical fiber 2. The calculation is performed on the assumption that the core diameter of the optical fiber 2 is the same as the width of the main waveguide 3(500 μm). Here, the main waveguide 3 has a thickness of 80 μm, and the optical fiber 2 has two kinds of an aperture number(referred to as NA in the figure), 0.3 and 0.5. As described in FIG. 18, the shorter the distance between the optical fiber 2 and the main-waveguide end face 11, the coupling efficiency improves. The distance is favorably set at not more than 100 μm. It is more desirable to set the distance at not more than 50 μm so as to prevent a reduction in the coupling efficiency.

The main-waveguide end face 11 is also allowed to have a protection film such as a cover glass on the surface thereof in order to avoid damage resulting from a contact with the optical fiber 2. Further, it is allowed to fill a gap of the coupling portion between the main-waveguide end face 11 and the optical fiber 2 with a refractive index adjusting agent, which has a refractive index close to the refractive indexes of the main-waveguide end face 11 and the optical fiber 2.

Figure 19:
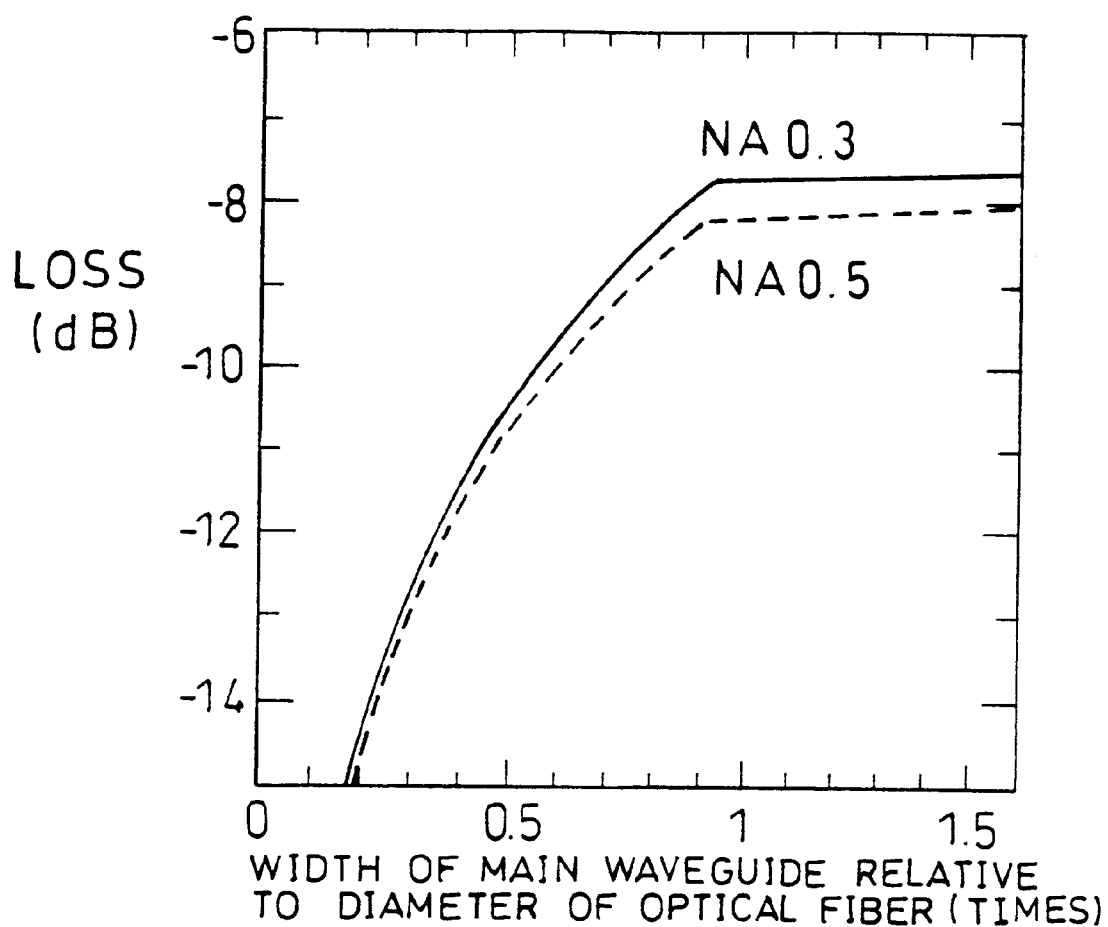
FIG. 19 is a graph which shows a relationship between coupling loss and the width of the main waveguide with regard to a core diameter of the optical fiber.

FIG. 19 shows a calculation result on the relationship between (a)the coupling efficiency of the main waveguide 3 and the optical fiber 2 and (b)the width of the main waveguide 3. The loss is determined by adding (a)the coupling loss of received light travelling from the optical fiber 2 to the main waveguide 3 and (b)the coupling loss of the transmitted light travelling from the main waveguide 3 to the optical fiber 2. It is assumed that the optical fiber 2 has two kinds of an aperture number, 0.3 and 0.5, the thickness of the main waveguide 3 is 80 µm, and the distance between the optical fiber 2 and the main-waveguide end face 11 is 50 µm.

As described in FIG. 19, when the width of the main waveguide 3 is less than 0.8 times the core diameter of the optical fiber 2, the coupling efficiency sharply declines. For this reason, it is desirable to set the width of the main waveguide 3 at not less than 0.8 times the core diameter of the optical fiber 2.

Naturally, since the above-mentioned arrangement is one of the examples, the construction is not particularly limited to this example. For instance, the main waveguide 3 and the sub waveguide 4 can be respectively arranged in a curve, or the width or the thickness can vary in a tapered shape.

As described above, with the optical transmit/receive module 1 in accordance with the first embodiment, a simple adjustment achieves a low-loss coupling to the multimode optical fiber, such as the POF, whose core diameter is relatively large, merely one optical fiber 2 enables a two-way communication, the transmission loss is small upon transmitting and receiving, influence of stray light is reduced, the coupling to the optical fiber 2 can be readily provided via the light-emitting element 7 and the sub waveguide 4, integration with other elements can be readily achieved, and a smaller version can be realized at low cost.

EMBODIMENT 2

Figure 20:
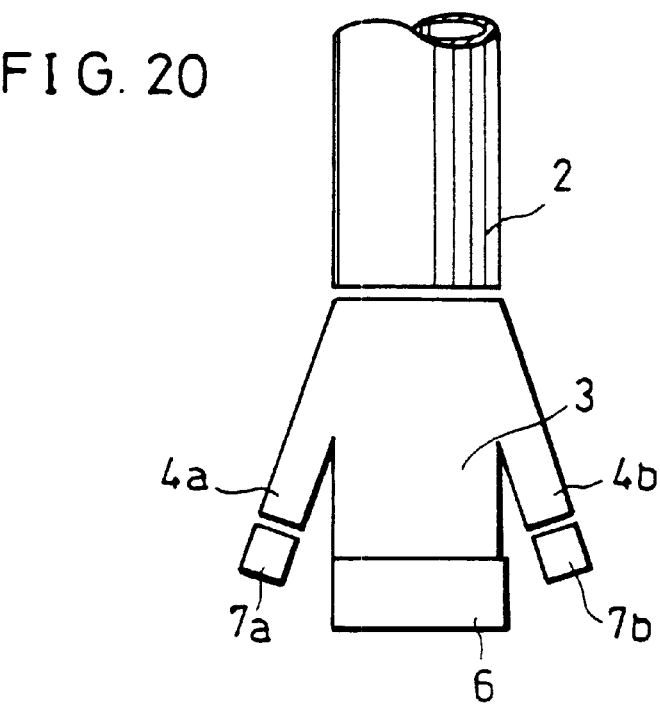
FIG. 20 is a schematic drawing which shows the two-way optical communication module in accordance with the second embodiment of the present invention.

Next, referring to FIG. 20, the following explanation describes the second embodiment. However, in the second embodiment, those members that have the same functions and that are described in the first embodiment are indicated by the same reference numerals and the description thereof is omitted.

In the second embodiment, a plurality of sub waveguides, for example, a first sub waveguide 4a and a second sub waveguide 4b are formed on a main waveguide 3. The first sub waveguide 4a and the second sub waveguide 4b are respectively coupled to the main waveguide 3 on the sides thereof. Light emitted from a first light-emitting element 7a, which is coupled to the first sub waveguide 4a, propagates through the first sub waveguide 4a. The light is coupled to the main waveguide 3 and enters the optical fiber 2. Light emitted from a second light-emitting element 7b, which is coupled to the second sub waveguide 4b, propagates through the second sub waveguide 4b. The light is coupled to the main waveguide 3 and enters the optical fiber 2.

The first light-emitting element 7a and the second light-emitting element 7b are arranged so as to emit light with different wavelengths such as 780 nm and 650 nm. Further, between the main waveguide 3 and a light-receiving element 6, for example, a wave-length separating element such as an interference filter can be provided so as to allow merely light having the wavelength of the received light to enter. Moreover, the number of sub waveguides 4 can be not less than three.

With this arrangement of the optical transmit/receive module 1, it is possible to achieve a wave-length multiplex communication by using a plurality of the sub waveguides 4. As described above, a two-way optical communication link described in the second embodiment enables the wave-length multiplex communication, and it is possible to transmit and receive high-density information, namely, a larger amount of information via the optical communication.

EMBODIMENT 3

Figure 21:
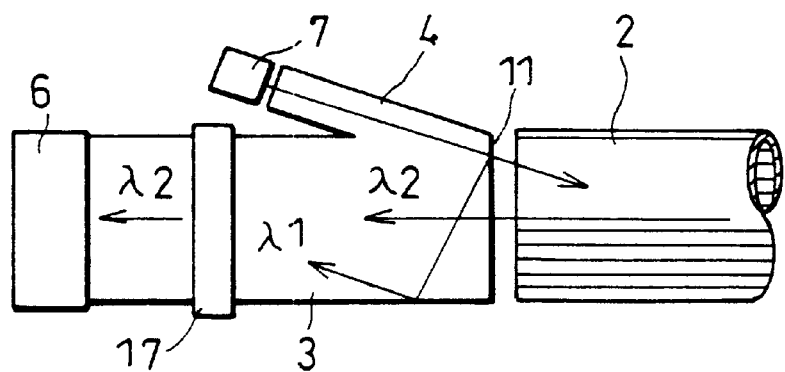
FIG. 21 is a schematic drawing which shows the two-way optical communication module in accordance with the third embodiment of the present invention.
Figure 22:
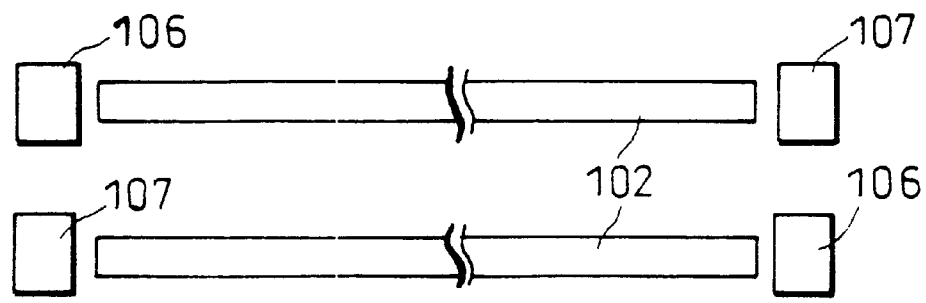
FIG. 22 is a conceptual drawing of a conventional two-way optical communication apparatus.
Figure 23:
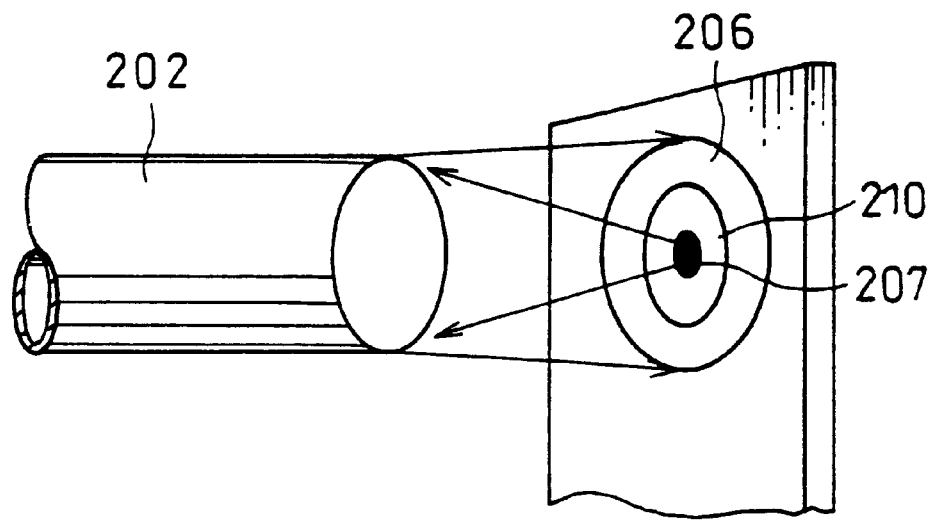
FIG. 23 is an explanatory drawing which shows another conventional two-way optical communication apparatus.
Figure 24:
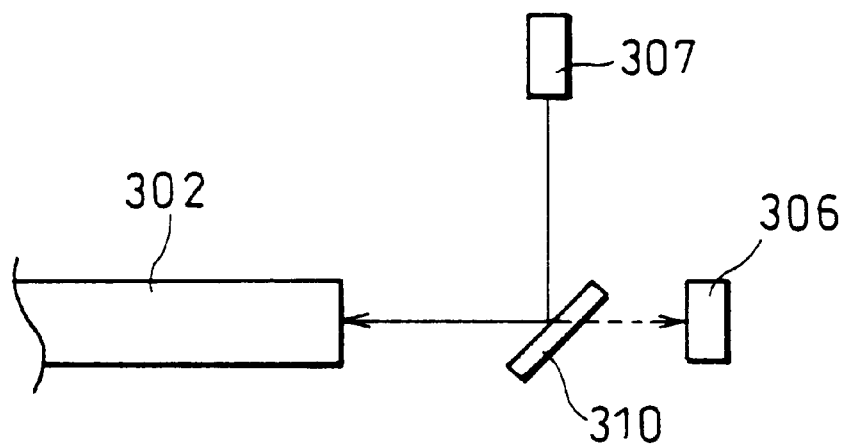
FIG. 24 is an explanatory drawing which shows still another conventional two-way optical communication apparatus.
Figure 25:
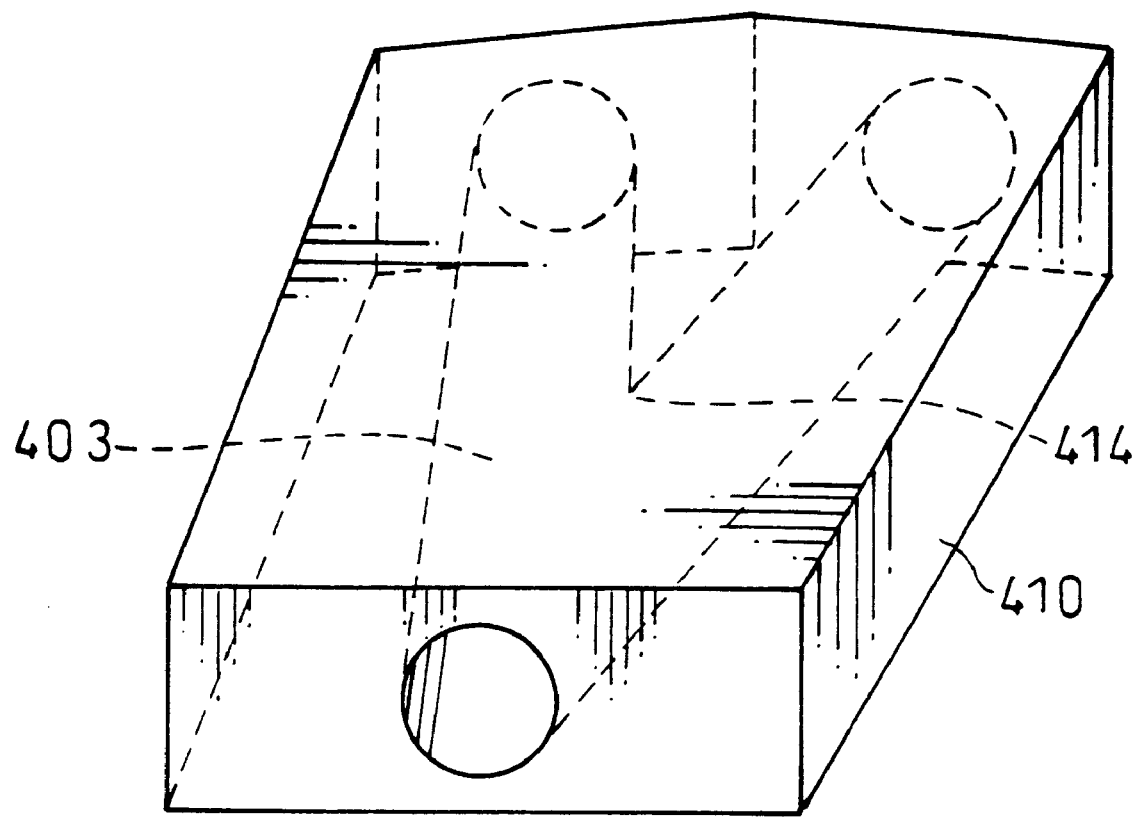
FIG. 25 is an explanatory drawing which shows still another conventional two-way optical communication apparatus.

Next, referring to FIG. 21, the following explanation describes the third embodiment. However, in the third embodiment, those members that have the same functions and that are described in the first and second embodiments are indicated by the same reference numerals and the description thereof is omitted.

With the arrangement of the embodiment 3, a light-emitting element 7 of an optical transmit/receive module 1 is arranged so as to emit light with a wavelength of λ1, which is different from a wavelength λ2 of a light-emitting element of a second optical transmit/receive module(not shown) disposed on the other end of an optical fiber 2. And, on an optical path(optical axis) between a main waveguide 3 and a light-receiving element 6, a wavelength separating element 17 such as an interference filter is provided. The wavelength separating element 17 transmits light having the wavelength λ2 but shield light having the wavelength λ1.

Transmitted light which is emitted from the lightemitting element 7 propagates through a sub waveguide 4 and enters the optical fiber 2. However, a part of the transmitted light is reflected on a main-waveguide end face 11 or the end face of the optical fiber 2. Hence, in the case when the wavelengths λ1 and λ2 are identical with each other, it is not possible to discriminate between the reflected light and light simultaneously transmitted from the second optical transmit/receive module(not shown). Therefore, in this case, merely a half-duplex communication can be carried out in a stable manner.

However, with the arrangement of the third embodiment, the wavelengths λ1 and λ2 are arranged so as to be different from each other, and the wave-length separating element 17 separates light in accordance with each wavelength; thus, it is possible to carry out a full-duplex communication in a stable manner.

Naturally, the second optical transmit/receive module which is coupled to the other end of the optical fiber 2 is arranged so as to have the transmitted light with wavelength λ2 and the received light with wavelength λ1. Further, with regard to a method for separating wavelengths, it is possible to adopt light-receiving elements 6 whose wavelength sensitivities are different from each other, in addition to a method using the wavelength separating element 17. The wavelength separating element 17 is provided between the main waveguide 3 and the light-receiving element 6 so that it is possible to separate the wavelengths in a more positive manner.

As described above, a two-way optical communication link described in the third embodiment achieves the full-duplex communication with one optical fiber 2 and improves the transmitting speed of the two-way optical communication.

As described above, a first two-way optical communication device is characterized by a main waveguide which is optically coupled to an optical fiber and directs light incident from the optical fiber to a light-receiving element, and a sub waveguide which is optically coupled to the side of the main waveguide with regard to the direction of an optical axis of the main waveguide and directs light incident from a light-emitting element to the optical fiber via the main waveguide.

In accordance with the first two-way optical communication device, the sub waveguide is coupled to the side of the main waveguide so that the optical axis of the sub waveguide is formed in a different direction from the optical axis of the main waveguide. Thus, received light which is directed from the optical fiber to the main waveguide cannot be readily coupled to the sub waveguide; consequently, the received light can be coupled to the light-receiving element with high efficiency.

Further, with the first two-way optical communication device, light transmitted from the light-emitting element is coupled to the main waveguide from the sub waveguide, and the light is coupled to the optical fiber from the main waveguide with high efficiency. For this reason, the first two-way optical communication device achieves the two-way optical communication with one optical fiber.

Furthermore, with the first two-way optical communication device, in the case when an optical fiber for propagating multimode light is adopted as an optical fiber, the core diameter of the optical fiber can be arranged larger than that of a single-mode optical fiber so that it is possible to optically couple between the main waveguide and the optical fiber, which has a large core diameter, in a simpler manner as compared with the case of the conventional single-mode optical fiber.

Moreover, with the first two-way optical communication device, even if a conventional optical branch device is omitted, it is possible to achieve the two-way optical communication for handling transmitted light and received light so that transmission loss and influence of stray light are reduced; therefore, it is possible to increase sensitivity to reception with a simple and inexpensive construction.

In addition, with the first two-way optical communication device, it is possible to efficiently provide a two-way optical communication with one optical fiber at low cost; therefore, this arrangement is preferably adopted for a two-way optical communication apparatus(two-way optical communication link) for a small-scale network.

As described above, with the arrangement of the first two-way optical communication device, the second two-way optical communication device of the present invention is characterized in that the main waveguide is arranged so as to set a number of modes of light propagating through the main waveguide larger than that of light propagating through the sub waveguide.

With the second two-way optical communication device, the number of modes of light propagating through the main waveguide is set larger than that of light propagating through the sub waveguide so that light received from the optical fiber cannot readily propagate through the sub waveguide; thus, received light can propagate to the light-receiving element with high efficiency. Further, transmitted light can also propagate through the sub waveguide with high efficiency. Consequently, it is possible to achieve high-efficiency transmission and reception as compared with the case of the conventional optical branch path.

As described above, with the arrangement of the first two-way optical communication device, the third two-way optical communication device of the present invention is characterized in that a cross-sectional area with regard to the direction orthogonal to the optical axis of the main waveguide is set larger than that of the sub waveguide.

With the third two-way optical communication device, the cross-sectional area of the main waveguide is set larger than that of the sub waveguide so that light incident from the multimode optical fiber can be efficiently coupled to the main waveguide. Meanwhile, the sub waveguide cannot be readily coupled to light incident from the optical fiber so that it is possible to couple light emitted from the light-emitting element to the optical fiber with high efficiency.

As described above, with the arrangement of the first, second, or third two-way optical communication device, the fourth two-way optical communication device of the present invention is characterized in that the core portions of the main waveguide and the sub waveguide are made of plastic.

With the fourth two-way optical communication device, the core portions of the main waveguide and the sub waveguide are made of plastic so that it is easy to work on a thick film and it is possible to efficiently provide a coupling to the optical fiber with a large diameter by making a simple adjustment.

As described above, with the arrangement of the fourth two-way optical communication device, the fifth two-way optical communication device of the present invention is characterized in that the core portions are made of plastic which is mainly composed of polyimide.

With the fifth two-way optical communication device, the core portions of the main waveguide and the sub waveguide are made of plastic which is mainly composed of polyimide so that it is possible to realize the main waveguide and the sub waveguide which have high heat resistance and high optical transmissivity; thus, even when semiconductor laser is used as the light-emitting element, it is possible to realize the main waveguide and the sub waveguide which can reduce adverse effect of a heating operation with small loss, upon forming an ohmic electrode in installing the semiconductor laser.

Further, it is possible to work by using a dry etching technology so that manufacturing is possible by using a semiconductor process. For example, it is possible to readily work on the substrate made of semiconductor, and highly-precision manufacturing is available at low cost.

As described above, with the arrangement of any one of the first through fifth two-way optical communication devices, the sixth two-way optical communication device of the present invention is characterized in that an angle formed by the optical axes of the sub waveguide and the main waveguide is set at not more than 22°.

With the sixth two-way optical communication device, the angle formed by the optical axes of the sub waveguide and the main waveguide is set at not more than 22°; thus, it is possible to couple light, which is emitted from the light-emitting element and propagates through the sub waveguide, to the main waveguide with small loss. Further, it is possible to efficiently couple light, which is emitted from the optical fiber to the main waveguide, to the light-receiving element.

As described above, with the arrangement of any one of the first through sixth two-way optical communication devices, the seventh two-way optical communication device of the present invention is characterized in that an angle, which is formed by the optical axis of the sub waveguide and the optical axis of the core of the optical fiber, is set at not more than 17.

With the seventh two-way optical communication device, the angle, which is formed by the optical axis of the sub waveguide and the optical axis of the core of the optical fiber, is set at not more than 17° so that light which is emitted from the main waveguide to the optical fiber is totally reflected within the optical fiber with high efficiency before propagating; therefore, this arrangement cannot readily cause loss within the optical fiber and it is possible to efficiently transmit light through the optical fiber.

As described above, with the arrangement of any one of the first through seventh two-way optical communication devices, the eighth two-way optical communication device of the present invention is characterized in that an angle, which is formed by the optical axis of the main waveguide and the optical axis of the core of the optical fiber, is set at not more than 17°.

With the eighth two-way optical communication device, the angle, which is formed by the optical axis of the main waveguide and the optical axis of the core of the optical fiber, is set at not more than 17°; therefore, light incident from the main waveguide to the optical fiber cannot be readily damaged within the optical fiber so that light can be efficiently transmitted, and it is possible to set the large cross-sectional area of the main waveguide at the coupling portion to the optical fiber so that light received from the optical fiber can be efficiently transmitted to the light-receiving element.

As described above, with the arrangement of any one of the first through eighth two-way optical communication devices, the ninth two-way optical communication device of the present invention is characterized in that the main waveguide is provided with a plurality of sub waveguides.

With the ninth two-way optical communication device, a plurality of the sub waveguides are provided; thus, a plurality of the light-emitting elements have different wavelengths for each of the sub waveguides so as to readily perform a wavelength multiplex communication; consequently, the two-way optical communication can be achieved with high density.

As described above, with the arrangement of any one of the first through ninth two-way optical communication devices, the tenth two-way optical communication device of the present invention is characterized in that the main waveguide and the sub waveguide are formed on a substrate.

With the tenth two-way optical communication device, the main waveguide and the sub waveguide are formed on the same substrate; therefore, integration with other elements can be readily carried out so as to achieve a smaller version of the tenth two-way optical communication device. Furthermore, it is possible to simplify the manufacturing process.

As described above, with the arrangement of the tenth two-way optical communication device, the eleventh two-way optical communication device of the present invention is characterized in that an optical coupler is provided for inducing light, which is incident from the optical fiber to the main waveguide, to the light-receiving element formed on the substrate.

With the eleventh two-way optical communication device, the light-receiving element can be covered with the main waveguide so that stray light cannot readily enter the light-receiving element. Further, the light-receiving element is formed on the substrate and the main waveguide is formed thereon so that a manufacturing process can be carried out by using the semiconductor process; therefore, it is possible to readily adjust the positions of the light-receiving element and the main waveguide with high precision.

Moreover, the eleventh two-way optical communication device enables a manufacturing process using the semiconductor process so that it is possible to achieve a smaller version of the eleventh two-way optical communication device. Furthermore, the eleventh two-way optical communication device is capable of coupling between the main waveguide and the sub waveguide by using an optical coupler and is capable of coupling light propagating the main waveguide to the light-receiving element with high efficiency.

Consequently, with the eleventh two-way optical communication device, the optical coupler, which directs received light from main waveguide to the light-receiving element, is provided on the main waveguide which covers the light-receiving element formed on the substrate so that it is possible to achieve a smaller version and improve the sensitivity to reception at low prices.

As described above, with the arrangement of the tenth or eleventh two-way optical communication device, the twelfth two-way optical communication device of the present invention is characterized in that the width of the sub waveguide is set at not less than 40 $\mu$m at least at the portion on which the sub waveguide is coupled to the light-emitting element.

With the twelfth two-way optical communication device, the width of the sub waveguide is set at not less than 40 $\mu$m at the portion on which the sub waveguide is coupled to the light-emitting element so that in the case when, for example, semiconductor laser is used as the light-emitting element, it is possible to couple between the sub waveguide and the semiconductor laser with a simple adjustment.

As described above, with the arrangement of any one of the tenth through twelfth two-way optical communication devices, the thirteenth two-way optical communication device of the present invention is characterized in that the width of the sub waveguide is set at not less than 35 $\mu$m at least at the portion on which the sub waveguide is coupled to the light-emitting element.

With the thirteenth two-way optical communication device, the width of the sub waveguide is set at not less than 35 $\mu$m at the portion on which the sub waveguide is coupled to the light-emitting element so that in the case when, for example, semiconductor laser is used as the light-emitting element, it is possible to couple between the sub waveguide and the semiconductor laser with a simple adjustment.

As described above, with the arrangement of any one of the tenth through thirteenth two-way optical communication devices, the fourteenth two-way optical communication device of the present invention is characterized in that the thickness of the main waveguide is the same as that of the sub waveguide.

With the fourteenth two-way optical communication device, the thickness of the main waveguide is the same as that of the sub waveguide; therefore, the main waveguide and the sub waveguide are simultaneously formed in accordance with the semiconductor manufacturing process so that it is possible to readily form both of the main waveguide and the sub waveguide.

As described above, with the arrangement of any one of the tenth through fourteenth two-way optical communication devices, the fifteenth two-way optical communication device of the present invention is characterized in that the width of the main waveguide is set at not less than 0.8 times as large as the core diameter of the optical fiber at least at the portion on which the main waveguide is coupled to the optical fiber.

With the fifteenth two-way optical communication device, the width of the main waveguide is set at not less than 0.8 times as large as the core diameter of the optical fiber at least at the portion on which the main waveguide is coupled to the optical fiber so that it is possible to couple light incident from the optical fiber to the main waveguide with high efficiency and to couple light incident from the main waveguide to the optical fiber with high efficiency.

As described above, with the arrangement of any one of the tenth through fifteenth two-way optical communication devices, the sixteenth two-way optical communication device of the present invention is characterized in that the light-emitting element coupled to one end of the optical fiber has a light-emitting wavelength which is different from that of the light-emitting element coupled to the other end of the optical fiber.

With the sixteenth two-way optical communication device, the light-emitting element coupled to one end of the optical fiber has a light-emitting wavelength which is different from that of the light-emitting element coupled to the other end of the optical fiber so that two-way full-duplex communication is achieved with one optical fiber.

As described above, with the arrangement of the sixteenth two-way optical communication device, the seventeenth two-way optical communication device of the present invention is characterized in that a wavelength separating element is provided between the main waveguide and the light-receiving element.

With the seventeenth two-way optical communication device, the wavelength separating element separates wavelengths so as to control light entering the light-emitting element, thereby regulating entry of light having unnecessary wavelength. Thus, it is possible to carry out a full-duplex communication in a more positive manner.

As described above, a first two-way optical communication apparatus which carries out a two-way optical communication with a plurality of the two-way optical communication devices, each being optically coupled to each end of the optical fiber for propagating multimode light, is characterized in that at least one of a plurality of the two-way optical communication devices is any one of the first through seventeenth two-way optical communication devices.

With the first two-way optical communication apparatus, even if a conventional optical branch device is omitted, the two-way optical communication for handling transmitted light and received light can be achieved so as to reduce transmission loss and influence of stray light; therefore, it is possible to increase sensitivity to reception with a simple construction.

As described above, with the arrangement of the first two-way optical communication apparatus, the second two-way optical communication apparatus is characterized in that a plastic optical fiber whose core is made of plastic is adopted as an optical fiber.

With the second two-way optical communication apparatus, a POF is used as an optical fiber so that bending loss is small, resistance to cracking is offered, and a fiber with a large diameter of approximately 1 mm can be easily manufactured; therefore, the POF makes it easy to adjust the coupling between the optical fiber and the main waveguide and to lower the price of the two-way optical communication device.

As described above, with the arrangement of the second two-way optical communication apparatus, the third two-way optical communication apparatus is characterized in that in the case when the core is made of plastic mainly composed of a polymethyl methacrylate resin, the light-emitting element emits light with a wavelength of approximately 650 nm.

With the second two-way optical communication apparatus, a plastic whose core is mainly composed of polymethyl methacrylate is adopted as a POF, and a semiconductor laser or a LED with a wavelength of approximately 650 nm is adopted as the light-emitting element so that it is possible to realize the lower-priced two-way optical communication device which is highly reliable with small loss.

As described above, with the arrangement of the second two-way optical communication apparatus, the fourth two-way optical communication apparatus is characterized in that in the case when the core is made of plastic which is mainly composed of a polycarbonate resin, the light-emitting element emits light with a wavelength of approximately 780 nm.

With the fourth two-way optical communication apparatus, a plastic whose core is mainly composed of polycarbonate is adopted as the POF, and a semiconductor laser or a LED with a wavelength of approximately 780 nm is adopted as the light-emitting element so that it is possible to realize the lower-priced two-way optical communication device which is highly reliable with small loss.

As described above, with the arrangement of the first two-way optical communication apparatus, the fifth two-way optical communication device is characterized in that a hard-polymer clad fiber, in which the clad is made of plastic and the core is made of quartz, can be adopted as the optical fiber.

With the fifth two-way optical communication apparatus, a hard-clad quartz optical fiber, in which the clad is made of a hard polymer and the core is made of quartz, is adopted as the optical fiber serving as a medium so that the wide transmitting band makes it possible to communicate at high speed over a long distance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-way optical communication device for carrying out a two-way communication with an optical fiber, comprising:

a main waveguide which is optically coupled to said optical fiber and directs light incident from said optical fiber to a light-receiving element, and a sub waveguide which is optically coupled to a side of said main waveguide with regard to an optical axis direction thereof and directs light emitted from a light-emitting element to said optical fiber.

2. The two-way optical communication device as defined in claim 1, wherein light propagating through said main waveguide has modes the number of which is larger than that of light propagating through said sub waveguide.

3. The two-way optical communication device as defined in claim 1, wherein said main waveguide has a cross-sectional area orthogonal to an optical axis thereof, the cross-sectional area being larger than that of said sub waveguide.

4. The two-way optical communication device as defined in claim 1, wherein each of said main waveguide and said sub waveguide includes a core portion which is made of plastic.

5. The two-way optical communication device as defined in claim 4, wherein said core portion is made of plastic mainly composed of polyimide.

6. The two-way optical communication device as defined in claim 1, wherein an angle formed by optical axes of said main waveguide and said sub waveguide is set at not more than 22°.

7. The two-way optical communication device as defined in claim 1, wherein an angle formed by optical axes of said sub waveguide and said optical fiber is set at not more than 17°.

8. The two-way optical communication device as defined in claim 1, wherein an angle formed by optical axes of said main waveguide and said optical fiber is set at not more than 17°.

9. The two-way optical communication device as defined in claim 1, wherein said main waveguide is formed in a state in which a core layer has a round shape in cross section.

10. The two-way optical communication device as defined in claim 1, wherein said main waveguide and said sub waveguide are integrated with each other on one substrate.

11. The two-way optical communication device as defined in claim 10, wherein said light-receiving element is embedded in said substrate with said main waveguide being formed on a light-receiving surface of the substrate, and an optical coupler is further included for providing a coupling between said light-receiving element and said main waveguide.

12. The two-way optical communication device as defined in claim 1, wherein said sub waveguide has a thickness of not less than 35 $\mu$m at least at a portion where said sub waveguide is coupled to the light-emitting element.

13. The two-way optical communication device as defined in claim 12, wherein said main waveguide has a thickness which is the same as that of said sub waveguide.

14. The two-way optical communication device as defined in claim 1, wherein said sub waveguide has a thickness of not less than 40 $\mu$m at least at a portion where said sub waveguide is coupled to the light-emitting element.

15. The two-way optical communication device as defined in claim 1, wherein a distance between an end face of said main waveguide and said optical fiber is not more than 100 82 m.

16. The two-way optical communication device as defined in claim 15, wherein said distance is not more than 50 $\mu$m.

17. The two-way optical communication device as defined in claim 1, wherein said main waveguide has a width of not less than 0.8 times as large as a core diameter of said optical fiber at least at a portion where said main waveguide is coupled to said optical fiber.

18. The two-way optical communication device as defined in claim 1, which emits light having a wavelength which is different from that of a two-way optical communication device installed on the other end of said optical fiber.

19. The two-way optical communication device as defined in claim 18, further comprising a wavelength separating element which transmits light incident from said optical fiber and regulates light emitted from said light-emitting element, said wavelength separating element being provided between said main waveguide and said light-receiving element.

20. A two-way optical communication device for carrying out a two-way communication with an optical fiber, comprising:
   a main waveguide which is optically coupled to said optical fiber and directs light incident from said optical fiber to a light-receiving element,
   a first sub waveguide which is optically coupled to a side of said main waveguide with regard to an optical axis direction thereof and directs light emitted from a first light-emitting element to said optical fiber, and
   a second sub waveguide which is optically coupled to a side of said main waveguide with regard to the optical axis direction thereof and directs light emitted from a second light-emitting element to said optical fiber,
   wherein the first light-emitting element and the second light-emitting element emit light having different wavelengths from each other.

21. The two-way optical communication device as defined in claim 20, further comprising a wavelength separating element which regulates light having a wavelength other than the wavelength received by said light-receiving element, said wavelength separating element being provided between said main waveguide and said light-receiving element.

22. A two-way optical communication apparatus for carrying out a two-way communication with an optical fiber, comprising:
   an optical fiber, and
   a plurality of two-way optical communication devices, each being constituted by a main waveguide which is optically coupled to said optical fiber and directs light incident from said optical fiber to a light-receiving element, and a sub waveguide which is optically coupled to a side of said main waveguide with regard to an optical axis direction thereof and directs light emitted from a light-emitting element to said optical fiber,
   wherein said two-way optical communication devices are disposed on respective ends of said optical fiber.

23. The two-way optical communication apparatus as defined in claim 22, wherein said optical fiber is a multi-mode optical fiber which has a larger core diameter as compared with a quartz optical fiber.

24. The two-way optical communication apparatus as defined in claim 22, wherein said optical fiber is a plastic optical fiber which includes a core made of plastic having a superior optically transmitting property and a clad made of plastic whose refractive index is lower than that of the core.

25. The two-way optical communication apparatus as defined in claim 22, wherein said optical fiber has a core made of plastic mainly composed of a polymethyl methacrylate resin.

26. The two-way optical communication apparatus as defined in claim 22, wherein said optical fiber has a core made of plastic mainly composed of a polycarbonate resin.

27. The two-way optical communication apparatus as defined in claim 22, wherein said optical fiber includes a core made of quartz glass and a clad made of a hard polymer.

* * * * *